United States Patent
Kutami et al.

(10) Patent No.: US 7,405,180 B2
(45) Date of Patent: Jul. 29, 2008

(54) WIRELESS INFORMATION RECORDING MEDIUM

(75) Inventors: Atsushi Kutami, Numazu (JP); Kazuhiro Goto, Toshima-ku (JP)

(73) Assignee: Ricoh Company, Ltd., Tokyo (JP)

( * ) Notice: Subject to any disclaimer, the term of this patent is extended or adjusted under 35 U.S.C. 154(b) by 540 days.

(21) Appl. No.: 11/226,194

(22) Filed: Sep. 15, 2005

(65) Prior Publication Data

US 2006/0077769 A1    Apr. 13, 2006

(30) Foreign Application Priority Data

Sep. 15, 2004    (JP) ............................. 2004-268280

(51) Int. Cl.
  *B41M 5/41*    (2006.01)
  *B41M 5/42*    (2006.01)
(52) U.S. Cl. .................. 503/201; 428/161; 428/209
(58) Field of Classification Search ................ None
  See application file for complete search history.

(56) References Cited

U.S. PATENT DOCUMENTS

| | | |
|---|---|---|
| 5,278,128 A | 1/1994 | Hotta et al. |
| 5,283,220 A | 2/1994 | Kawaguchi et al. |
| 5,448,065 A | 9/1995 | Masubuchi et al. |
| 5,583,554 A | 12/1996 | Masubuchi et al. |
| 5,700,746 A | 12/1997 | Kutami et al. |
| 5,869,421 A | 2/1999 | Kutami et al. |
| 5,869,422 A | 2/1999 | Kazumi et al. |
| 6,096,683 A | 8/2000 | Amano et al. |
| 6,154,243 A | 11/2000 | Tatewaki et al. |
| 6,177,383 B1 | 1/2001 | Amano et al. |
| 6,613,715 B2 | 9/2003 | Kutami et al. |

FOREIGN PATENT DOCUMENTS

| | | |
|---|---|---|
| JP | 11-059037 | 3/1999 |
| JP | 11-085938 | 3/1999 |
| JP | 11-091274 | 4/1999 |
| JP | 2000-094866 | 4/2000 |
| JP | 2000-251042 | 9/2000 |
| JP | 2001-063228 | 3/2001 |
| JP | 2001-239684 | 9/2001 |
| JP | 2002-103654 | 4/2002 |
| JP | 2002-117384 | 4/2002 |
| JP | 2003-141486 | 5/2003 |
| JP | 2003-141494 | 5/2003 |

*Primary Examiner*—Bruce H Hess
(74) *Attorney, Agent, or Firm*—Oblon, Spivak, McClelland, Maier & Neustadt, P.C.

(57) ABSTRACT

A wireless information recording medium including a reversible thermal recording medium, a cushioning material layer provided on the reversible thermal recording medium, an information recording section including an information recording element and an antenna circuit configured to receive and transmit information for the information recording element, and a support layer configured to support the information recording section, and provided on the cushioning material layer. The support layer is stacked on the cushioning material layer and the cushioning material is stacked on the reversible thermal recording medium in a step-wise configuration.

20 Claims, 8 Drawing Sheets

WIRELESS INFORMATION RECORDING MEDIUM

RELATED APPLICATION

This application claims benefit under 35 USC119 to Japanese application No. 2004-268280 the contents of which are hereby incorporated by reference.

BACKGROUND OF THE INVENTION

1. Field of the Invention

The present invention generally relates to a wireless information recording medium which includes a reversible thermal recording medium having an information recording section.

2. Description of the Related Art

A wireless information recording medium, that is a reversible thermal recording medium having an information recording section, includes a reversible thermal recording medium and an information recording section on the reversible thermal recording medium.

When information is re-written and stored in the information recording section, visual images corresponding to the information can be displayed on the reversible thermal recording medium.

FIGS. 1, 1A, and 1B show an example of a conventional wireless information recording medium. FIG. 1 is a top view of an example of a conventional wireless information recording medium 100. FIG. 1A is a sectional view at a line A-A in FIG. 1. FIG. 1B is a sectional view at a line B-B line in FIG. 1.

The wireless information recording medium 100 includes a reversible thermal recording medium 1, an adhesive layer 8, an information recording section 200, and a protection layer 7.

The adhesive layer 8 adheres the information recording section 200 to the reversible thermal recording medium 1.

The protection layer 7 covers the information recording section 200. The protection layer 7 includes a material of self-adhesiveness, in which the material can be adhered on a counterpart member by applying pressure to the material.

The information recording section 200 includes a support layer 3, an antenna circuit 4, and an information recording element 5.

The information recording element 5 includes an IC (integrated circuit) chip.

The antenna circuit 4 receives and transmits information for the information recording element 5.

The antenna circuit 4 and the information recording element 5 are provided on the support layer 3, and the information recording element 5 contacts the adhesive layer 8.

FIG. 2 shows another example of a conventional wireless information recording medium 101. FIG. 2A is a sectional view of the wireless information recording medium 101, similar to the FIG. 1A. FIG. 2B is a sectional view of the wireless information recording medium 101, similar to the FIG. 1B.

The wireless information recording medium 101 has substantially the same structure as the wireless information recording medium 100 in FIG. 1 except for the following.

As shown in FIG. 1, in the wireless information recording medium 100, the information recording element 5 of the information recording section 200 contacts the adhesive layer 8.

However, as shown in FIG. 2, in the wireless information recording medium 101, the support layer 3 of the information recording section 200 contacts the adhesive layer 8.

Therefore, it can be said that the information recording section 200 in the wireless information recording medium 100 is upside down in FIG. 2 compared to FIG. 1.

The above-described wireless information recording mediums 100 and 101 are transported in a direction shown by an arrow in FIGS. 1 and 1B or FIG. 2B, respectfully, and inserted into a re-writable recording apparatus (not shown).

In the re-writable recording apparatus, the reversible thermal recording medium 1 is configured to receive image deleting and recording processes.

During the image deleting and recording process (i.e., deleting and printing of images) to the above-described wireless information recording medium 100 or 101, the reversible thermal recording medium 1 is pressed to a heating device (not shown) such as a thermal head, deleting bar, deleting roller, or deleting plate in the re-writable recording apparatus.

As for the above-described wireless information recording medium 100 or 101, an outer periphery face of a layered structure formed with outer periphery faces of the protection layer 7, the support layer 3, and the adhesive layer 8 has a flush face and has a right angle with respect to a surface of the reversible thermal recording medium 1 as shown in FIG. 1B and FIG. 2B. Therefore, the reversible thermal recording medium 1 is unevenly pressed by the above-described heating device (not shown).

Accordingly, a convex shape corresponding to a shape of information recording section 200 may be formed on the reversible thermal recording medium 1. For example, the deleting roller rotates and presses a surface of the reversible thermal recording medium 1 at first, then the deleting roller runs upon the outer periphery face of the above-described layered structure having a flush face in one action, and presses the layered structure toward the reversible thermal recording medium 1.

When the deleting roller runs upon the layered structure, the deleting roller applies pressure to the layered structure in a direction which is opposite of the medium transport direction shown by the arrow in FIG. 1 or FIG. 2. In other words, a force which peels off the layered structure from the reversible thermal recording medium 1 may be applied from the deleting roller to the layered structure.

Accordingly, the reversible thermal recording medium 1 may not be uniformly heated by the heating device (not shown), thereby when printing images, a heat conduction in the reversible thermal recording medium 1 may not be uniformly conducted. Therefore, unevenness may happen to images recorded on the reversible thermal recording medium 1.

Furthermore, when deleting image information, the heating device (not shown) may unevenly contact the reversible thermal recording medium 1, thereby an insufficient image deletion may happen.

Furthermore, a convex shape corresponding to the shape of the information recording element 5 may be observed on the reversible thermal recording medium 1.

Because the information recording element 5 is pressed by the heating device (not shown) via the reversible thermal recording medium 1, the information recording element 5 may be peeled off from the reversible thermal recording medium 1 or may be damaged.

Furthermore, if the reversible thermal recording medium 1 becomes too large such as when an A4-sized sheet is used, an entire surface of the reversible thermal recording medium 1 may not be used effectively for image deleting and recording.

Therefore, there is a limit on the size of the reversible thermal recording medium 1 that can be used.

In order to cope with the above-described drawbacks, some background arts have been developed. However, such background arts may have some drawbacks such as the wireless information recording medium (reversible thermal recording medium having information recording section) may become thicker and harder.

If such a medium (e.g., a card) is used, there may be a drawback that an information re-writing and storing to the information recording element and an information re-writing and storing to the reversible thermal recording medium may not be conducted simultaneously by a re-writable recording apparatus used for reversible thermal recording.

SUMMARY OF THE INVENTION

The present invention relates to a wireless information recording medium configured to be inserted into a re-writable recording apparatus to re-write information in the wireless information recording medium. The wireless information recording medium includes a reversible thermal recording medium, a cushioning material layer provided on the reversible thermal recording medium, an information recording section having an information recording element and an antenna circuit for receiving and transmitting information for the information recording element, and a support layer configured to support the information recording section and provided on the cushioning material layer. The cushioning material layer and the support layer are stacked on the reversible thermal recording medium in a stepwise configuration.

The present invention also relates to a wireless information recording medium configured to be inserted into a re-writable recording apparatus to re-write information in the wireless information recording medium. The wireless information recording medium includes a reversible thermal recording medium, an information recording section having an information recording element and an antenna circuit for receiving and transmitting information for the information recording element, a support layer configured to support the information recording section and provided on the reversible thermal recording medium, and a cushioning material layer configured to cover the support layer. The support layer and the cushioning material are stacked on the reversible thermal recording medium in a stepwise configuration.

BRIEF DESCRIPTION OF THE DRAWINGS

A more complete appreciation of the disclosure and many of the attendant advantages and features thereof can readily be obtained and understood from the following detailed description with reference to the accompanying drawings, wherein.

DETAILED DESCRIPTION OF EXAMPLE EMBODIMENTS

Figure 1:
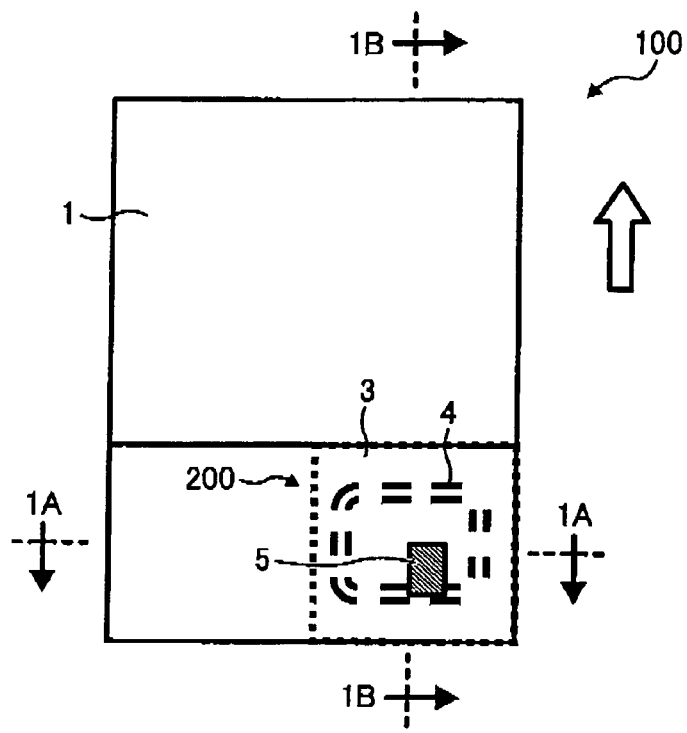
FIG. 1 is a top view of an example of a conventional wireless information recording medium.
Figure 2A:
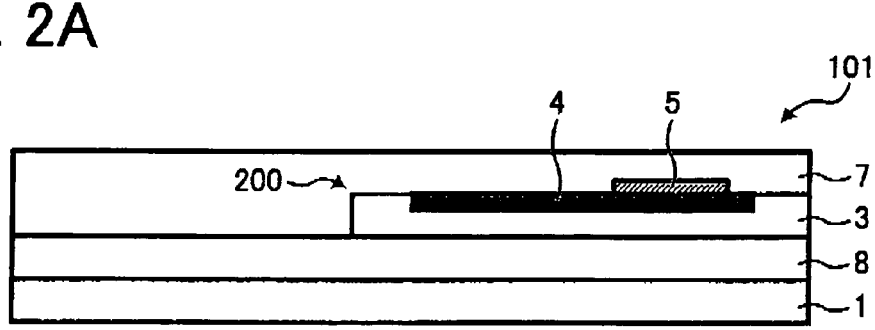
FIG. 2A is a sectional view of another example of a conventional wireless information recording medium.
Figure 2B:
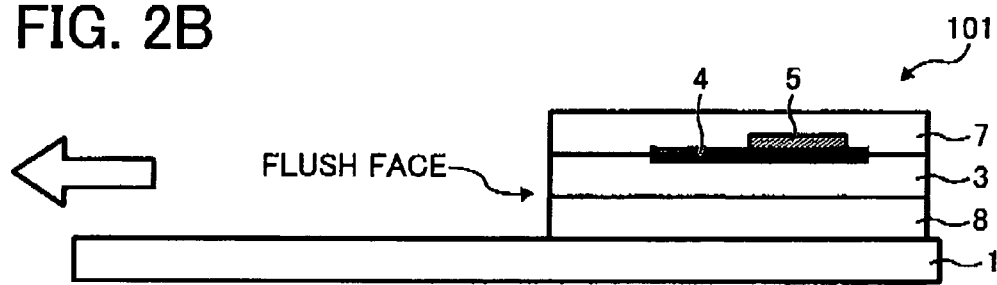
FIG. 2B is another sectional view of another example of a wireless information recording medium in FIG. 2A.

Using the wireless information recording medium 100 or 101 shown in FIG. 1 and FIG. 2, respectively, the present inventors experimentally made a product interposing a cushioning material layer between the reversible thermal recording medium 1 and the information recording section 200, and another product interposing a cushioning material layer between the protection layer 7 and the information recording section 200.

The outer periphery face of a layered structure is formed with the protection layer 7, the cushioning material layer, and the information recording section 200, which are provided on the reversible thermal recording medium 1; has a flush face; and a right angle with respect to a surface of the reversible thermal recording medium 1 similar to that shown in FIG. 1 and FIG. 2.

The present inventors conducted image deleting and recording experiments with such a modified wireless information recording medium, and found results as described below.

The above-described modified wireless information recording medium included a protection layer, an information recording section, a cushioning material layer, and a reversible thermal recording medium (e.g., a reversible thermal recording sheet).

In one case, the information recording section and the cushioning material layer were adhered to the reversible thermal recording medium. When image deleting and recording were repeatedly conducted on an entire surface of the reversible thermal recording medium, an image unevenness occurred on an area corresponding to an edge portion of the information recording section. Consequently, an insufficient color development occurred on such area.

As for the image deletion, a printed image was not deleted completely, or a deleted portion showed a fogging phenomena in which a pale color development corresponding to a shape of an IC (integrated circuit) tag label occurred on the reversible thermal recording medium.

Such phenomena may happen because a contact deficiency may happen on the outer periphery face of the layered structure having a flush face when conducting the image printing by applying a pressure from the heating device (not shown) to the wireless information recording medium (i.e., reversible thermal recording medium having IC tag label).

Accordingly, contact unevenness may occur on an area where the heating device (not shown) makes contact. Therefore, the heating device (not shown) may not uniformly heat the wireless information recording medium.

Such contact unevenness may vary a heat conduction rate when printing images. Consequently, the recorded image may have unevenness.

In a similar manner, when deleting images, contact unevenness occurs on an area where the heating device (not shown) makes contact, which leads to insufficient deletion.

Due to such contact unevenness, a fogging phenomena may happen, in which a pale color development corresponding to a shape of an IC tag occurs on the reversible thermal recording medium.

When image deleting and recording is repeatedly conducted on such a reversible thermal recording sheet, image concentration unevenness and a fogging phenomena may occur. Moreover, insufficient image deletion may become worse, and physical damage such as peel-off may happen on a stepped portion on the wireless information recording medium.

In describing example embodiments of the invention shown in the drawings, specific terminology is employed for the sake of clarity. However, the disclosure of this present invention is not intended to be limited to the specific terminology so selected and it is to be understood that each specific element includes all technical equivalents that operate in a similar manner.

Figure 3:
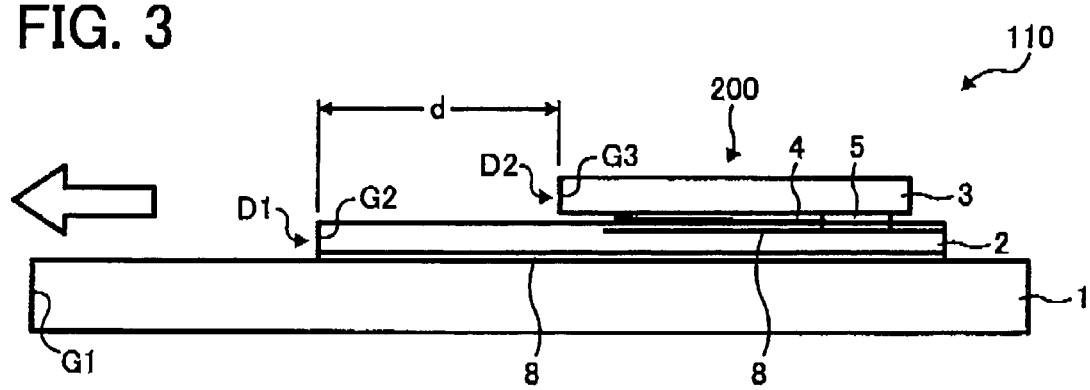
FIG. 3 is a sectional view of an example embodiment of a wireless information recording medium.
Figure 17:
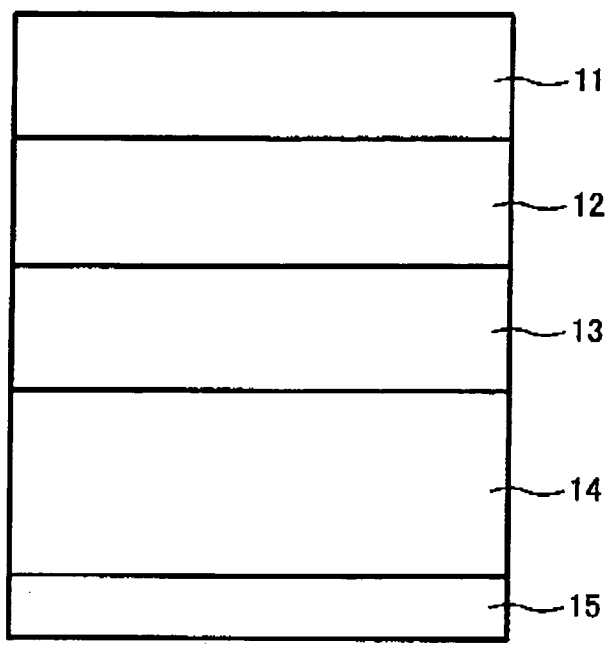
FIG. 17 is a schematic sectional view of a reversible thermal recording medium of a wireless information recording medium according to an example embodiment.
Figure 18:
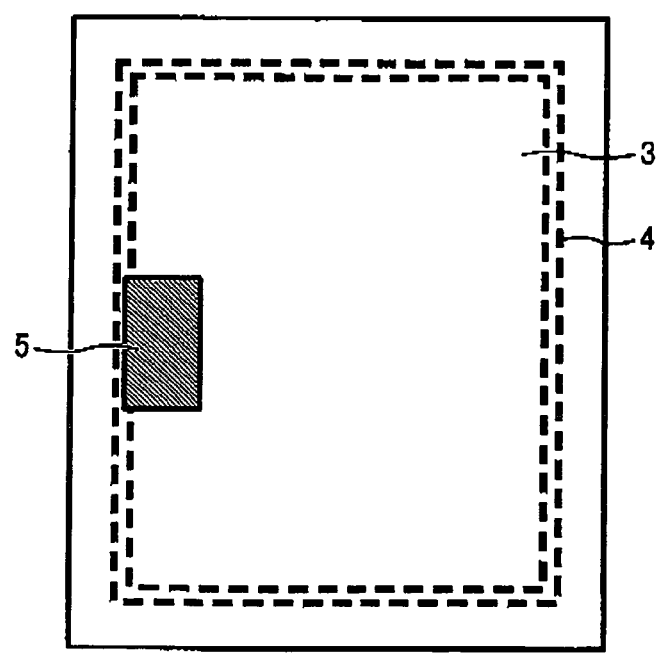
FIG. 18 is a schematic top view of an information recording section of a wireless information recording medium according to an example embodiment.

Referring now to the drawings, wherein like reference numerals designate identical or corresponding parts throughout the several views, and more particularly to FIGS. 3, 17, and 18, the wireless information recording medium according to an example embodiment is described.

FIG. 3 is a sectional view of a wireless information recording medium 110 according to an example embodiment (Example 1).

The wireless information recording medium 110 is transported in a direction shown by an arrow in FIG. 3, and inserted into the re-writable recording apparatus.

In the re-writable recording apparatus, image deletion and recording is conducted to the wireless information recording medium 110.

FIG. 17 is a schematic sectional view of a reversible thermal recording medium (e.g., reversible thermal recording sheet) of the wireless information recording medium 110.

FIG. 18 is a schematic top view of an information recording section 200 of the wireless information recording medium 110.

The wireless information recording medium 110 is configured as described below.

As shown in FIGS. 3 and 18, the information recording section 200 includes the support layer 3, the information recording element 5, and the antenna circuit 4.

On one side of the support layer 3, the information recording element 5 and the antenna circuit 4 are provided. The antenna circuit 4 is used for receiving and transmitting information for the information recording element 5.

The information recording section 200 is provided over the reversible thermal recording medium 1 via the cushioning material layer 2, and the support layer 3, wherein the support layer 3 is a top layer.

In this example, the cushioning material layer 2 has the adhesive layer 8 on both upper and lower surfaces of the cushioning material layer 2.

With the adhesive layer 8, the lower surface of the cushioning material layer 2 is adhered to the reversible thermal recording medium 1, and the upper surface of the cushioning material layer 2 is adhered to the information recording section 200.

Furthermore, the information recording section 200 includes a recording section and a deleting section having a predetermined size which corresponds to the dimensions (e.g., width) of the recording section and deleting section of the re-writable recording apparatus that conducts image recording and deleting processes to the reversible thermal recording medium 1. Specifically, the predetermined size includes a width which can fit a width of the recording section and deleting section of the re-writable recording apparatus.

As shown in FIG. 3, the wireless information recording medium 110 can be transported to the re-writable recording apparatus in a direction shown by an arrow in FIG. 3. The arrow direction is referred to as a medium transport direction, hereinafter, as required.

The reversible thermal recording medium 1 has an outer periphery face G1 and the cushioning material layer 2 has an outer periphery face G2, wherein both of the outer periphery face G1 and outer periphery face G2 face the medium transport direction.

As shown in FIG. 3, the outer periphery face G2 is positioned in a backward direction with respect to the outer periphery face G1 in the medium transport direction. Consequently, a step D1 is formed on the reversible thermal recording medium 1 with the outer periphery face G1 and the outer periphery face G2.

Hereinafter, a direction or side of the wireless information recording medium are referred to as below, as required. A "front side" of the wireless information recording medium is a side of the wireless information recording medium which is inserted into the re-writable recording apparatus. In other words, the wireless information recording medium is inserted into the re-writable recording apparatus from the "front side" of the wireless information recording.

A "rear side" of the wireless information recording medium is a side of the wireless information recording medium which is an opposite side of the "front side." In other words, the "rear side" of the wireless information recording medium is inserted into the re-writable recording apparatus after the "front side" of the wireless information recording is inserted into the re-writable recording apparatus.

As shown in FIG. 3, the support layer 3 has an outer periphery face G3 which is on the medium transport direction. The outer periphery face G3 is positioned in a backward direction with respect to the outer periphery face G2 in the medium transport direction. Consequently, a step D2 is formed on the cushioning material layer 2 with the outer periphery face G2 and the outer periphery face G3.

In an example embodiment, as shown in FIG. 3, the outer periphery face G2 of the cushioning material layer 2 and the outer periphery face G3 of the support layer 3 have a step-to-step distance "d," and it is preferable that the step-to-step distance "d" is 2 mm or greater.

As described above, the wireless information recording medium 110, according to an example embodiment, forms a three-step shape with the reversible thermal recording medium 1, the cushioning material layer 2, and the support layer 3.

The wireless information recording medium 110 according to an example embodiment can employ the following devices, for example. The reversible thermal recording medium 1 can be 530BD, 430BD, 431FB manufactured by the Ricoh Company, or TRCG99CS, TRCG99SS, TRCG99SH, TRCGAACS, TRCGBBBS manufactured by MITSUBISHI PAPER MILLS LIMITED.

The information recording section 200 can be an IC tag manufactured by Fujii, an IC tag manufactured by Omron Corporation, an IC tag manufactured by Alien Technology Corporation, an IC tag manufactured by Sony Corporation, an IC tag manufactured by Hitachi, Ltd., an IC tag manufactured by DNP (DAI NIPPON PRINTING CO., LTD.), or an IC tag manufactured by TOPPAN PRINTING CO., LTD.

The above-described reversible thermal recording medium 1 has a configuration shown in FIG. 17, for example. The reversible thermal recording medium 1 includes a cover layer 11, an intermediate layer 12, a reversible thermal recording layer 13, a base layer 14, and a back layer 15.

The layers are stacked as shown in FIG. 17: the back layer 15, the base layer 14, the reversible thermal recording layer 13, the intermediate layer 12, and the cover layer 11.

Figure 4:
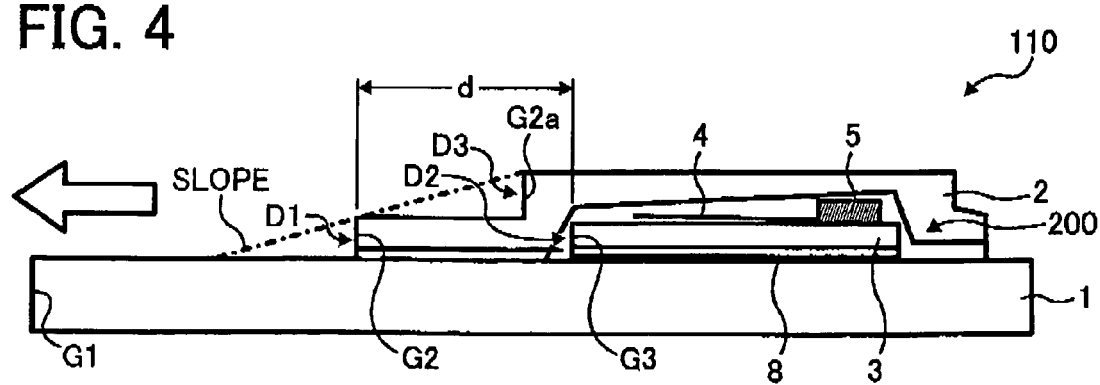
FIG. 4 is a sectional view of another example embodiment of a wireless information recording medium.

FIG. 4 is a sectional view of a wireless information recording medium 110 according to another example embodiment (Example 2). The wireless information recording medium 110 is transported in a direction shown by an arrow in FIG. 4, and inserted into the re-writable recording apparatus.

In the re-writable recording apparatus, image deletion and recording is conducted to the wireless information recording medium 110.

The wireless information recording medium 110 is configured as described below.

As shown in FIG. 4, the information recording section 200 includes the support layer 3, the information recording element 5, and the antenna circuit 4.

On one side of the support layer 3, the information recording element 5 and the antenna circuit 4 are provided, wherein the antenna circuit 4 is used for receiving and transmitting information for the information recording element 5.

The information recording section 200 is provided over the reversible thermal recording medium 1 while the support layer 3 faces the reversible thermal recording medium 1, and the information recording section 200 is entirely covered by the cushioning material layer 2.

Furthermore, the information recording section 200 includes a recording section and a deleting section having a predetermined size, which corresponds to dimensions (e.g., width) of the recording section and deleting section of the re-writable recording apparatus that conducts an image recording and deleting process to the reversible thermal recording medium 1. Specifically, the predetermined size includes a width which can fit a width of the recording section and deleting section of the re-writable recording apparatus.

As shown in FIG. 4, the wireless information recording medium 110 can be transported to the re-writable recording apparatus in a direction shown by an arrow in FIG. 4. The arrow direction is referred to as a medium transport direction, hereinafter as required.

The reversible thermal recording medium 1 has an outer periphery face G1 and the cushioning material layer 2 has a first outer periphery face G2 and a second outer periphery face G2a.

The outer periphery face G1, first outer periphery face G2, and second outer periphery face G2a face the medium transport direction.

As shown in FIG. 4, the first outer periphery face G2 is positioned in a backward direction with respect to the outer periphery face G1 in the medium transport direction. Consequently, a step D1 is formed on the reversible thermal recording medium 1 with the outer periphery face G1 and the first outer periphery face G2.

As also shown in FIG. 4, the second outer periphery face G2a is positioned in a backward direction with respect to the first outer periphery face G2 in the medium transport direction. Consequently, a step D3 is formed on the cushioning material layer 2 with the first outer periphery face G2 and the second outer periphery face G2a.

As shown in FIG. 4, the support layer 3 has an outer periphery face G3 which faces the medium transport direction. The outer periphery face G3 is positioned in a backward direction with respect to the outer periphery face G1 in the medium transport direction. Consequently, a step D2 is formed on the reversible thermal recording medium 1 with the outer periphery face G1 and the outer periphery face G3. The second outer periphery face G2 and the outer periphery face G3 are closely positioned to each other.

In an example embodiment shown in FIG. 4, the first outer periphery face G2 of the cushioning material layer 2 and the outer periphery face G3 of the support layer 3 have a step-to-step distance "d," and it is preferable that the step-to-step distance "d" is 2 mm or greater.

Hereinafter, with reference to FIGS. 3, 4, and 17, the above-described wireless information recording medium 110 and reversible thermal recording medium 1 are explained in detail. First, the information recording section 200 is described below. The information recording section 200 includes the support layer 3, the information recording element 5 (e.g., IC chip or IC circuit), and the antenna circuit 4. The antenna circuit 4 and the information recording element 5 are provided on the support layer 3. The information recording element 5 and the antenna circuit 4 are electrically coupled.

The support layer 3 includes a rigid type material such as paper phenol or glass epoxy; a flexible type material such as polyimide film, polyester film, paper, or synthetic paper; and a combined type material which is a mix of the rigid and flexible type materials.

A thickness of the support layer 3 is preferably set from 5 to 250 μm to reduce a height of the steps, for example.

In order to protect the information recording element 5, a protection film such as polyimide film, polyester film, or paper (see protection layer 7 which is described with reference to FIGS. 5 and 6) can be adhered on an exposed surface of the IC chip (or IC circuit).

A thickness of the protection film is preferably set from 5 to 250 μm to reduce a height of the steps, for example.

The adhesive layer 8 can be used to adhere the information recording section 200 directly to the reversible thermal recording medium 1, or indirectly to the reversible thermal recording medium 1 via the cushioning material layer 2.

The adhesive layer 8 can be also used to adhere the above-described protection film to the information recording element 5.

The adhesive layer 8 includes a material of self-adhesiveness, in which the material can be adhered on a counterpart member by applying pressure to the material during a manufacturing process.

The self-adhesiveness material can be adhered with pressure under a condition of room temperature or a heated condition.

Specifically, such material includes urea resin, melamine resin, phenol resin, epoxy resin, vinyl acetate resin, vinyl acetate-acrylic copolymer, ethylene vinyl acetate copolymer, acrylic resin, polyvinyl ether resin, vinyl chloride-vinyl acetate copolymer, polystyrene resin, polyester resin, polyurethane resin, polyamide resin, chlorinated polyolefin resin, polyvinylbutyral resin, acrylic ester copolymer, methacrylic ester copolymer, natural rubber, synthetic rubber, cyanoacrylate resin, silicone resin, or ethylene vinyl acetate adhesive, for example.

The types and thickness of the adhesive layer 8, which adheres the information recording section 200 to the reversible thermal recording medium 1, preferably can be selected by considering conditions such as the type of member to be adhered to, usage environment, and adhesive strength.

The adhesive layer 8 can be formed by drying a generally used water-based or solvent-based adhesive, and the adhesive layer 8 can be formed from natural rubber, synthetic rubber, acrylic material, or the like.

Such polymer adhesive can be used with organic solvent or used as dispersion or emulsion in water.

In order to reduce an effect of shape irregularities of the IC chip in the wireless information recording medium according to example embodiments, it is preferable to provide the adhesive layer 8 to a side facing the IC chip.

Preferably, the adhesive layer 8 includes natural rubber, synthetic rubber, acrylic material, silicone, urethane, SIS block polymer, or ethylene vinyl acetate copolymer as its main component.

The adhesive layer 8 can include a mixture of the above-described material, as required, and can also include additives, inorganic or organic filler or fiber material.

The adhesive strength of the adhesive layer 8 can preferably be set as required. If the adhesive strength of the adhesive layer 8 is set to a relatively small value but having enough strength to attach the information recording section 200, the information recording section 200 can be easily detached for repeated use.

If the adhesive strength of the adhesive layer 8 is set to a relatively larger value, the information recording section 200 is hard to peel off. Consequently, such a wireless information recording medium can be used for a long period of time. As such, the adhesive strength of the adhesive layer 8 can be set to any value by considering a usage of the wireless information recording medium.

In addition, a surface of the protection layer 7, which is not used for adhesive effect, can be processed to have properties such as water repellency, oil repellency, or static charge prevention, as required.

If the protection layer 7 employs a similar layer as used by a back layer 15 to be described later, a change of friction coefficient on a back surface of a reversible thermal recording medium having a non-contact IC tag can be reduced.

Hereinafter, the cushioning material layer 2 is described.

The cushioning material layer 2 can include paper, resin film, synthetic paper, metallic foil, resin plate, metal plate, glass, sheet or plate made from a composite of the above-described materials.

In example embodiments, it is preferable to use a material having a higher cushionability such as foam polyurethane, staple fiber, or rubber at an outer surface of the cushioning material layer 2.

The cushioning material layer 2 also preferably includes a material having cushionability such as sponge material (e.g., foam polyurethane), a composite of hard material and soft material, staple fiber, or rubber, for example.

To adhere the cushioning material layer 2 to the upper face or lower face of the information recording section 200 as shown in FIG. 3 or FIG. 4, the support layer 3 needs an adhesive layer on a surface of the support layer 3.

The adhesive layer can employ materials similar to the above-described adhesive layer 8, and if the adhesive layer has cushionability too, the material can be used as the support layer 3.

Hereinafter, the above-described reversible thermal recording medium 1 is explained.

As shown in FIG. 17, the reversible thermal recording medium 1 includes a reversible thermal recording layer 13, wherein the reversible thermal recording layer 13 is a thermosensitive layer which can reversibly change color tone, and includes a material that can reversibly show a visualized change according to a temperature change.

The visualized change includes a color change and a shape change. In example embodiments, a material which can show a color change is primarily used.

The color change includes properties such as color transmission coefficient, reflection coefficient, absorption wavelength, and scattering degree. An actual reversible thermal recording material uses a combination of such properties to show image change.

Specifically, a material, which can reversibly change transparency and color tone by heat, can be used. For example, a material shows a first color at a first predetermined temperature, which is higher than room temperature, and the material is heated to a second predetermined temperature, which is higher than the first predetermined temperature, then cooled to show a second color.

Specifically, a material, which can change color states at the first predetermined temperature and the second predetermined temperature, can preferably be used.

For example, one material changes to a transparent state at a first predetermined temperature, and changes to a whitish state at a second predetermined temperature.

Another material shows color development at a second predetermined temperature, and loses color state at a first predetermined temperature.

Another material becomes a whitish state at a first predetermined temperature, and becomes a transparent state at a second predetermined temperature.

Another material shows color development such as black, red, and blue at a first predetermined temperature, and loses the color state at a second predetermined temperature.

In such materials, it is preferable to use a system which disperses organic low molecular materials such as higher fatty acid in resin material, or a system using leuco dye and long-chain alkyl developer.

As for the leuco dye used for the reversible thermal recording medium, at least one compound can be used as a dye precursor such as phthalide compound, azaphthalide compound, fluorane compound, or the like. As for the long-chain alkyl developer, publicly known material can be used.

The developer to be used in the example embodiments is a compound including a structure, which can develop the leuco dye as color, such as phenol hydroxyl group, carboxylic acid group, phosphate group or the like, and a structure, which controls cohesive power between molecules, such as a linked structure of long chain hydrocarbon groups.

A linked portion can include a coupling group having hetero atom and divalent or greater value, and the long chain hydrocarbon group can include a similar coupling group or aromatic group.

Such reversible developer includes publicly known materials, and one compound or a mixture of compounds can be used.

As for the reversible thermal recording layer 13 shown in FIG. 17, additives, which can improve or control coating characteristic, color development characteristic, color loss characteristic, can be included, as required.

The additives include, a surface active agent, a conductant agent, filler, antioxidant, a color-development stabilizing agent, a color-loss accelerating agent, or the like.

As such, the reversible thermal recording layer 13 is formed with leuco dye, developer, additives, and binder resin.

Such binder resin includes a publicly known resin or a mixture of publicly known resins, which can bind the above-described materials on the base layer 14.

Specifically, in order to improve durability for repeated use, resins which can be curable by heat, ultraviolet ray, or electron beam are preferably used.

Such resin preferably includes a thermosetting resin such as acrylic polyol resin, polyester polyol resin, polyurethane polyol resin, polyvinylbutyral resin, cellulose acetate propionate, or cellulose acetate butyrate which have groups reacting with a crosslinking agent such as isocyanate compound, or a copolymer resin having a monomer which reacts with a crosslinking agent and other monomer. However, other compounds can be used for example embodiments.

When crosslinking is conducted, it is preferable that the reversible thermal recording layer 13 have a gel ratio of 30% or greater. If the gel ratio is too low, durability of the reversible thermal recording layer 13 may deteriorate due to a lower crosslinking.

It is more preferable that the reversible thermal recording layer 13 have a gel ratio of 50% or greater, and further preferably that it have a gel ratio of 70% or greater.

In the reversible thermal recording layer 13, it is preferable that a ratio of color development component and resin is 1 against 0.1 to 10.

If the resin ratio is too low, the reversible thermal recording layer 13 may not have enough heat strength, and if the resin ratio is too large, color development concentration may become lower, which is not favorable.

Furthermore, a crosslinking or non-crosslinking state of binder resin used for example embodiments can be distinguished by immersing a coating of binder resin in a solvent having a higher solubility. Specifically, binder resin of non-crosslinking state dissolves in the solvent.

Curing agents for the above-described binder resin are limited to a specific type. However, an isocyanate curing agent is preferably used.

Specifically, the isocyanate curing agent includes hexamethylene diisocyanate (HDI), tolylene diisocyanate (TDI), xylylene diisocyanate (XDI), isophorone diisocyanate (IPDI), adduct type/buret-bonded type/isocyanurate type/ blocked isocyanate of the above-described HDI, TDI, XDI, or IPDI obtained by a reaction with trimethylol propane.

Specifically, the hexamethylene diisocyanate and the adduct type, buret-bonded type, isocyanurate type of the hexamethylene diisocyanate are preferably used.

All of the added curing agent may not need to react for crosslinking reaction. That is, it is no problem if some curing agent does not react.

Furthermore, some catalysts can be used as a crsosslinking accelerator in such a reaction.

The reversible thermal recording layer 13 can be prepared as a coating solution by uniformly mixing and dispersing the leuco dye, developer, additives, and binder resin in a solvent.

Specifically, such solvent includes alcohol, ketone, ether, glycol ether, ester, aromatic hydrocarbon, and aliphatic hydrocarbon. However, other solvent can also be used in example embodiments.

The coating solution can be prepared by using a publicly known dispersing device such as a paint shaker, ball mill, pulverizing mill, three-roll mill, Kedy mill, sand mill, dyno mill, or colloid mill.

The above-described material can be dispersed in the solvent one by one with the dispersing device, for example.

By heating the dispersion, and subsequent rapid or slow cooling, a product can be separated from the solvent.

A coating method includes any publicly known methods without any limitation such as blade coating, wire bar coating, spray coating, air knife coating, bead coating, curtain coating, gravure coating, kiss coating, reverse roll coating, dip coating, or dye coating.

The cover layer 11 shown in FIG. 17 having a thickness of 0.1 to 10 μm can be preferably made of a resin curable by heat, ultraviolet ray, or electron beam, and it is more preferable to use resins curable by ultraviolet ray.

Such resins curable by ultraviolet ray or electron beam include oligomer of urethane acrylate, epoxy acrylate, polyester acrylate, polyether acrylate, vinyl, unsaturated polyester, or monomers of monofunctional/polyfunctional acrylate, methacrylate, vinyl ester, ethylene derivative, allyl compound.

When conducting a crosslinking reaction with ultraviolet ray, a photoinitiator and a photo-polymerization accelerator may be used.

When conducting a crosslinking reaction with heat, thermosetting resin such as acrylic polyol resin, polyester polyol resin, polyurethane polyol resin, polyvinylbutyral resin, cellulose acetate propionate, cellulose acetate butyrate which have groups reacting with a crosslinking agent such as isocyanate compound, or a copolymer resin having a monomer which reacts with a crosslinking agent and other monomer can be used.

The back layer 15 shown in FIG. 17 can include dilution solvent, inorganic/organic filler, lubricant, color pigment, static charge prevention agent in addition to the above-described resin.

Therefore, the back layer 15 may include organic or inorganic filler for ultraviolet ray absorption reagent, lubricant, color pigment, or the like.

The inorganic filler includes carbonate, silicate, metal oxide, sulphuric compound, for example.

The organic filler includes silicone resin, cellulose resin, epoxy resin, nylon resin, phenol resin, polyurethane resin, urea resin, melamine resin, polyester resin, polycarbonate resin, styrene resin, acrylic resin, polyethylene resin, formaldehyde resin, or polymethyl methacrylate resin, for example.

The ultraviolet ray absorption reagent includes compounds having a salicylate structure, cyano acrylate structure, benzotriazol structure, or benzophenone structure, for example.

The lubricant includes synthesis wax, plant wax, animal wax, higher alcohol, higher fatty acid, higher fatty acid ester, or amide, for example. However other compounds can be also used in example embodiments.

A coating of the back layer 15 can be conducted by the above-described dispersing device and coating method, for example.

As shown in FIG. 17, the intermediate layer 12 is preferably provided between the reversible thermal recording layer 13 and the cover layer 11 in order to improve adhesiveness of the cover layer 11 to the reversible thermal recording layer 13, to prevent a deterioration of the reversible thermal recording layer 13 due to a coating of cover layer 11, and to prevent migration of additives included in the cover layer 11 into the reversible thermal recording layer 13. With such a configuration, an image life of color-developed image can be improved.

Furthermore, the cover layer 11 and the intermediate layer 12, which are layered on the reversible thermal recording layer 13, can be made of resin materials having a lower oxygen permeability to prevent or lower the oxidation of the color development agent and developer in the reversible thermal recording layer 13.

The intermediate layer 12 is mainly made of resin materials which include thermosetting resin, thermoplastic resin, ultra violet curable resin, and electron beam curable resin as described below.

Specifically, the resin materials include polyethylene, polypropylene, polystyrene, polyvinyl alcohol, polyvinylbutyral, polyurethane, saturated polyester, unsaturated polyester, epoxy resin, phenol resin, polycarbonate, or polyamide.

The intermediate layer 12 may include a filler and a ultraviolet ray absorption reagent, as required.

The intermediate layer 12 preferably has a thickness of 0.1 to 20 μm, and more preferably has a thickness of 0.3 to 3 μm.

The intermediate layer 12 preferably includes a filler with a volume ratio of 1 to 95%, and more preferably with a volume ratio of 5 to 75%.

The intermediate layer 12 can include an organic ultraviolet ray absorption reagent, which is used in the cover layer 11, and the intermediate layer 12 preferably includes such reagent with 0.5 to 10 weight ratio against 100 weight ratio of binder resin.

As for the solvent used for coating the intermediate layer 12, the dispersing device for coating solution, the coating method of the intermediate layer 12, and the drying/curing method of the intermediate layer 12, publicly known methods used for the reversible thermal recording layer 13 and the cover layer 11 can be used.

Furthermore, in order to improve sensitivity of color development and adhesiveness, an under layer (not shown) can be provided between the reversible thermal recording layer 13 and the base layer 14.

Furthermore, a light/heat conversion layer, which absorbs a laser beam and converts light to heat, can be provided so that laser recording can be conducted.

Furthermore, to prevent "curling" of the reversible thermal recording medium 1 (e.g., reversible thermal recording film), the back layer 15 can be provided on the base layer 14, which is an opposite side with respect to the reversible thermal recording layer 13.

The back layer 15 is provided to reduce an effect of "curling" due to a contraction of resin in the reversible thermal recording layer 13, and the back layer 15 is preferably made of resins curable by heat, ultraviolet ray or electron beam, and the back layer 15 is more preferably made of resins curable by ultraviolet ray.

The resins curable by ultraviolet ray or electron beam include oligomer of urethane acrylate, epoxy acrylate, polyester acrylate, polyether acrylate, vinyl, unsaturated polyester, or monomers of monofunctional/polyfunctional acrylate, methacrylate, vinyl ester, ethylene derivative, allyl compound.

When conducting a crosslinking reaction with ultraviolet ray, a photoinitiator and a photo-polymerization accelerator may be used.

When conducting a crosslinking reaction with heat, thermosetting resin such as acrylic polyol resin, polyester polyol resin, polyurethane polyol resin, polyvinylbutyral resin, cellulose acetate propionate, cellulose acetate butyrate which have groups reacting with a crosslinking agent such as isocyanate compound, or a copolymer resin having a monomer which reacts with a crosslinking agent and other monomer can be used.

In addition to the above-described resin, the back layer 15 can include dilution solvent, inorganic/organic filler, lubricant, color pigment, and static charge prevention agent.

The back layer 15 is provided to reduce an effect of the contraction of the reversible thermal recording layer 13 in the reversible thermal recording medium 1. Therefore, it is preferable that coating of the reversible thermal recording medium 1 is conducted in a manner so that a balance of the contraction between a surface layer side and a back layer side of the reversible thermal recording medium 1 can be achieved, and it is preferable that the reversible thermal recording medium 1 has a flat surface layer and a flat back layer after coating the above-described layers.

Furthermore, the reversible thermal recording medium 1 is preferably provided with a heat insulation layer such as an air layer to prevent heat dissipation.

In the above-described reversible thermal recording medium 1 having the non-contact IC tag, an image can be developed by heating the reversible thermal recording medium 1 at a color development temperature or higher and subsequently conducting a rapid cooling.

Specifically, for example, a thermal head or a laser beam heat a thermal recording layer in a small area during a short period of time. Consequently, heat dissipates rapidly and a rapid cooling happens, and then an image is developed.

On one hand, the image can lose color state by heating for a relatively longer time using an adequate heat source and subsequent cooling, or by heating at a temperature slightly lower than the color development temperature.

If the thermal recording layer is heated for a relatively longer time, a larger area of the thermal recording layer is heated. Consequently, subsequent cooling may take a longer time, and the image loses color state during such process.

In this case, a heating method can employ a heat roller, heat stamp, heat wind, or the like, and a relatively longer heating time by using a thermal head, for example.

In order to heat the reversible thermal recording layer 13 in a color loss temperature, voltage and pulse width applied to the thermal head can be slightly lowered from an energy level applied to the thermal head when recording an image, for example.

With such a method, image recording and deleting (i.e., over-writing) can be conducted by only the thermal head. Of course, the heat roller or the heat stamp can be used for heating reversible thermal recording layer 13 in a color loss temperature to lose color state.

The above-described reversible thermal recording medium having a non-contact IC tag includes a reversible thermal recording section and an information recording section.

Therefore, information recorded in the information recording section can be displayed on the reversible thermal recording section.

Accordingly, such information can be confirmed without using any special device, which leads to an improvement of the usability.

The information recording section preferably employs a non-contact IC type as a recording device. A magnetic recording method has some drawbacks such as memory error by magnetic field, lower memory capacity, and information tampering. A contact IC type has a drawback of degradation at contact point. An optical memory has a drawback of flexibility. Therefore, the non-contact IC type is preferably used.

In a manufacturing process, the above-described reversible thermal recording medium, according to example embodiments, can be made as a reversible thermal recording film, and formed as a roll or sheet.

Then the reversible thermal recording film can be adhered to the non-contact IC circuit, or further receives a process such as etching.

The processed film can be used in a variety of usages such as a ticket; a sticker for frozen food containers, industrial products, or medicine containers; or a document sheet (e.g., A4 sized sheet) for logistic management, manufacturing process management, or document management, for example.

Figure 5:
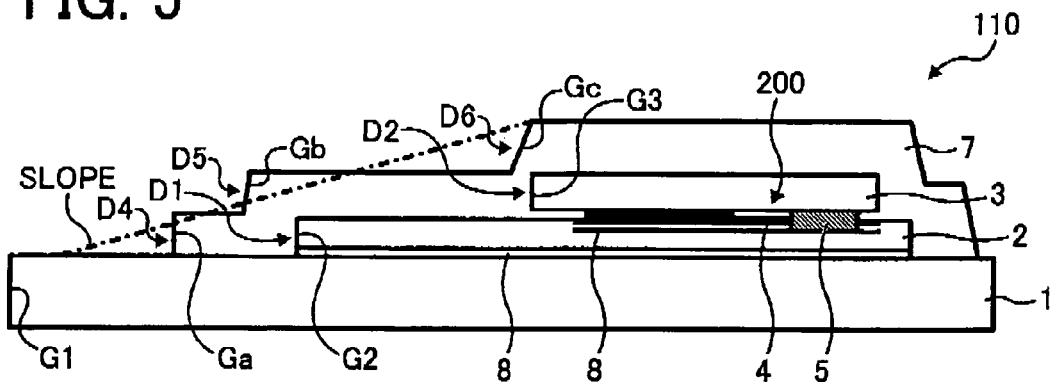
FIG. 5 is a sectional view of another example embodiment of a wireless information recording medium.

FIG. 5 is a sectional view of the wireless information recording medium 110 of one example (Example 3).

The wireless information recording medium 110 is transported in a leftward direction in FIG. 5, and further transported in a re-writable recording apparatus.

The re-writable recording apparatus conducts image deletion and recording process to the wireless information recording medium 110.

The wireless information recording medium 110 according to Example 3 is configured as described below.

The wireless information recording medium 110 according to Example 3 is one modification of the wireless information recording medium 110 according to Example 1 in FIG. 3.

Different from the wireless information recording medium 110 according to Example 1 in FIG. 3, in Example 3, the information recording section 200 and the cushioning material layer 2 are entirely covered by the protection layer 7, which is a self-adhesive layer.

Furthermore, the protection layer 7 includes a step-wise shape thereon, which is formed on the protection layer 7 in each proximity portion at an outer periphery face of reversible thermal recording medium 1, at an outer periphery face of the cushioning material layer 2, and at an outer periphery face of the support layer 3.

Such a step-wise shape is formed on the protection layer 7 as described below. As shown in FIG. 5, an outer periphery face Ga of the protection layer 7 is positioned in a backward direction with respect to an outer periphery face G1 of the reversible thermal recording medium 1 in a medium transport direction. Accordingly, the outer periphery face Ga forms a step D4 on the reversible thermal recording medium 1.

As also shown in FIG. 5, an outer periphery face Gb of the protection layer 7 forms a step D5 in a proximity portion of the above-described outer periphery face G2, and an outer periphery face Gc of the protection layer 7 forms a step D6 in a proximity portion of the above-described outer periphery face G3.

Figure 6:
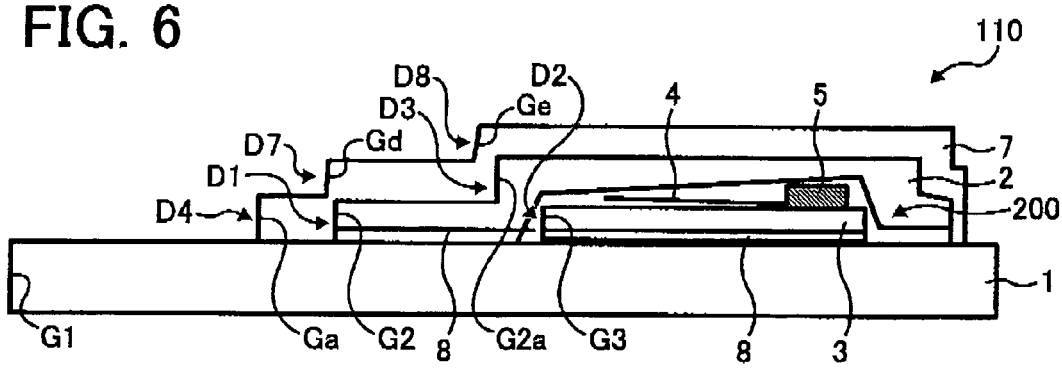
FIG. 6 is a sectional view of another example embodiment of a wireless information recording medium.

FIG. 6 is another sectional view of the wireless information recording medium 110 of one example (Example 4).

The wireless information recording medium 110 is transported in a leftward direction in FIG. 5, and further transported in a re-writable recording apparatus.

The re-writable recording apparatus conducts image deletion and recording (image deleting and recording) processes to the wireless information recording medium 110.

The wireless information recording medium 110 according to Example 4 is configured as described below.

The wireless information recording medium 110 according to Example 4 is one modification of the wireless information recording medium 110 according to Example 2 in FIG. 4.

Different from wireless information recording medium 110 according to Example 2 in FIG. 4, in Example 4, the cushioning material layer 2 is entirely covered by the protection layer 7 (self-adhesiveness layer).

Furthermore, the protection layer 7 includes a step-wise shape thereon, which is formed on the protection layer 7. The step-wise shape is formed on the protection layer 7. As shown in FIG. 6, an outer periphery face Ga of the protection layer 7 is positioned in a backward direction with respect to an outer periphery face G1 of the reversible thermal recording medium 1 in a medium transport direction.

Accordingly, the outer periphery face Ga forms a step D4 on the reversible thermal recording medium 1.

As also shown in FIG. 6, an outer periphery face Gd of the protection layer 7 forms a step D7 in a proximal portion of the outer periphery face G2, and an outer periphery face Ge of the protection layer 7 forms a step D8 in a proximal portion of the outer periphery face G2a of the cushioning material layer 2.

Figure 7:
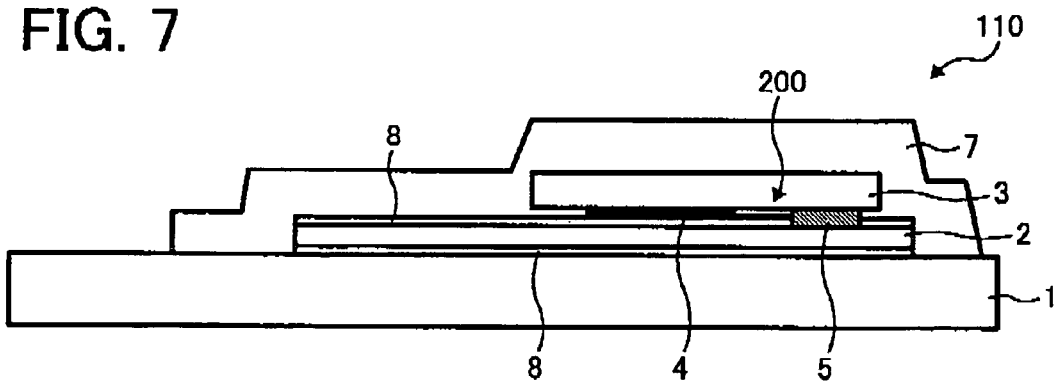
FIG. 7 is a sectional view of another example embodiment of a wireless information recording medium.

FIG. 7 is another sectional view of the wireless information recording medium 110 of one example (Example 5).

The wireless information recording medium 110 is transported in a leftward direction in FIG. 7, and further transported in a re-writable recording apparatus.

The re-writable recording apparatus conducts image deletion and recording (image deleting and recording) processes to the wireless information recording medium 110.

The wireless information recording medium 110 according to Example 5 is configured as described below.

The wireless information recording medium 110 according to Example 5 is one modification of the wireless information recording medium 110 according to Example 3 in FIG. 5.

In Example 5, the cushioning material layer 2 employs fabric (textile) or non-woven fabric, and the cushioning material layer 2 has the adhesive layer 8 on each top and bottom face of the cushioning material layer 2.

As shown in FIG. 7, the information recording section 200 is adhered on the top face of the cushioning material layer 2, and the protection layer 7 covers the information recording section 200 and the cushioning material layer 2 entirely.

As shown in FIG. 7, the bottom face of the cushioning material layer 2 is adhered to the reversible thermal recording medium 1 via the adhesive layer 8.

Furthermore, the protection layer 7 is adhered on the reversible thermal recording medium 1 with an effect of self-adhesiveness of the protection layer 7.

Other configurations of Example 5 are similar to Example 3 in FIG. 5.

Figure 8:
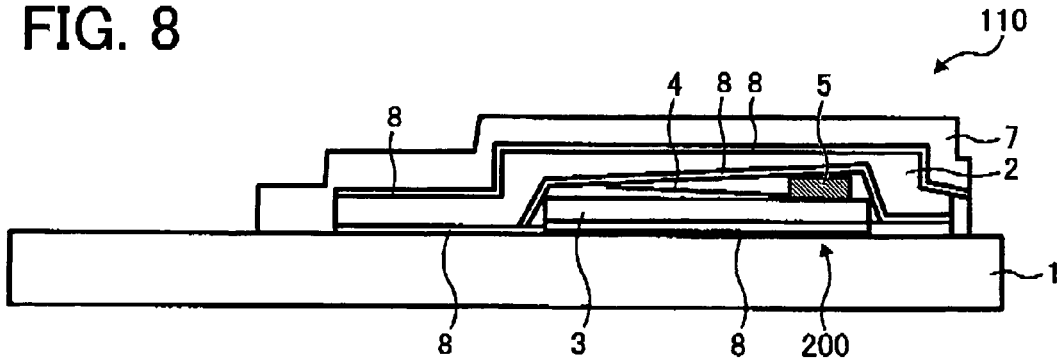
FIG. 8 is a sectional view of another example embodiment of a wireless information recording medium.

FIG. 8 is another sectional view of the wireless information recording medium 110 of one example (Example 6).

The wireless information recording medium 110 is transported in a leftward direction in FIG. 8, and further transported in a re-writable recording apparatus.

The re-writable recording apparatus conducts image deletion and recording (image deleting and recording) processes to the wireless information recording medium 110.

The wireless information recording medium 110 according to Example 6 is configured as described below.

The wireless information recording medium 110 according to Example 6 is one modification of the wireless information recording medium 110 according to Example 4 in FIG. 6.

In Example 6, the cushioning material layer 2 can employ fabric (textile) or non-woven fabric, and the cushioning material layer 2 has the adhesive layer 8 on each top and bottom face of the cushioning material layer 2.

As shown in FIG. 8, the protection layer 7a is adhered on a top face of the cushioning material layer 2, and the information recording section 200 and the reversible thermal recording medium 1 are adhered on a bottom face of the cushioning material layer 2.

Furthermore, the protection layer 7 is adhered on the reversible thermal recording medium 1 with an effect of self-adhesiveness of the protection layer 7.

FIGS. 9, 10, 11, and 12 are other sectional views of the wireless information recording medium 110, and correspond to Examples 7, 8, 9, and 10, respectively.

In FIGS. 9 to 12, the wireless information recording medium 110 is transported in a leftward direction, and further transported in a re-writable recording apparatus.

The re-writable recording apparatus conducts image deletion and recording (image deleting and recording) processes to the wireless information recording medium 110.

In the wireless information recording medium 110 according to Examples 7 to 10, the cushioning material layer 2 is formed as a double layer made of fabric (textile) or non-woven fabric.

Figure 9:
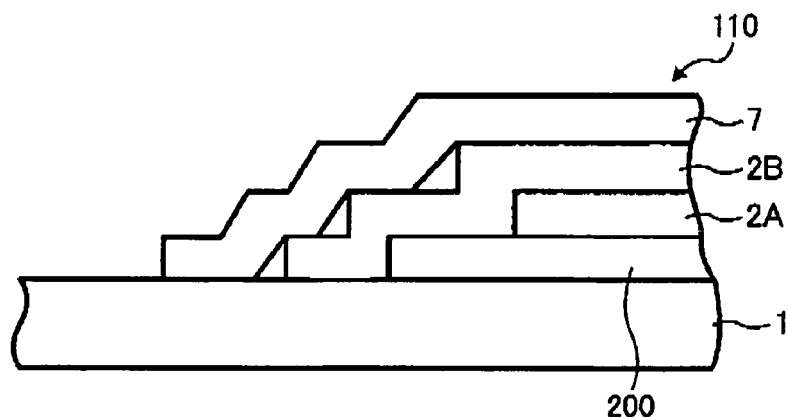
FIG. 9 is a sectional view of another example embodiment of a wireless information recording medium.
Figure 10:
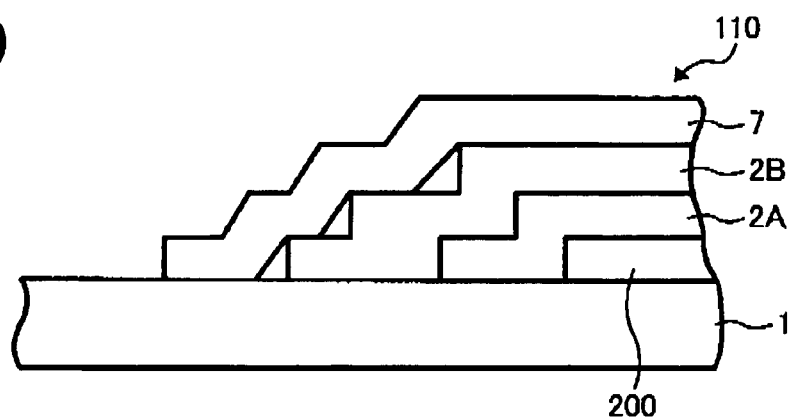
FIG. 10 is a sectional view of another example embodiment of a wireless information recording medium.
Figure 11:
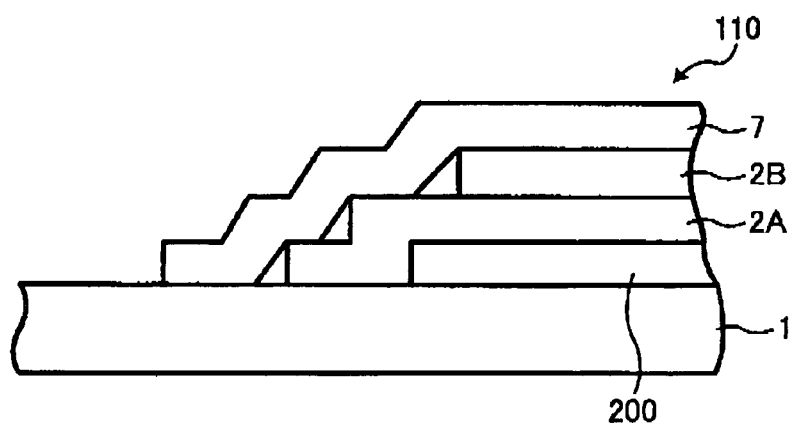
FIG. 11 is a sectional view of another example embodiment of a wireless information recording medium.

Furthermore, in the wireless information recording medium 110 according to FIGS. 9 to 11, a bottom face of the information recording section 200 is adhered on the reversible thermal recording medium 1, and double-layered cushioning material layers 2A and 2B are provided on a top face of the information recording section 200. Then the protection layer 7 covers the cushioning material layers 2A and 2B.

However, as shown in FIGS. 9 to 11, the cushioning material layers 2A and 2B have different shapes at a side facing the medium transport direction for each of Examples 7 to 9.

For example, in FIG. 9, the cushioning material layer 2A (under layer) does not have a stepped shape, but the cushioning material layer 2B (top layer) has a three-step shape.

Figure 12:
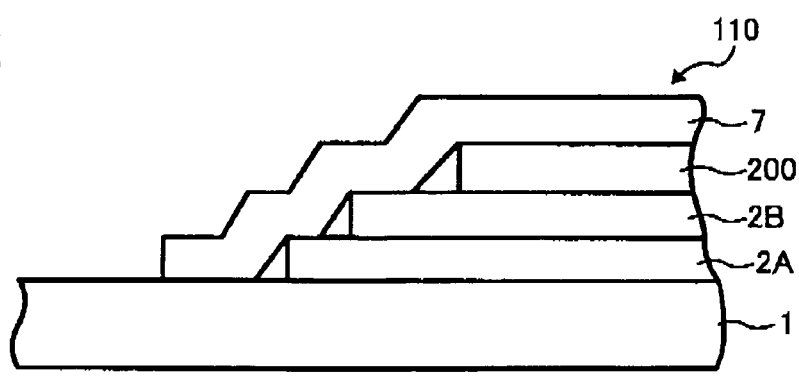
FIG. 12 is a sectional view of another example embodiment of a wireless information recording medium.

In the wireless information recording medium 110 in FIG. 12, double-layered cushioning material layers 2A and 2B are adhered on the reversible thermal recording medium 1, and the information recording section 200 is provided on the cushioning material layer 2B. Then the protection layer 7 covers the information recording section 200, and the cushioning material layers 2A and 2B.

FIGS. 13, 14, 15, and 16 are other sectional views of the wireless information recording medium 110, and correspond to Example 11, Example 12, Example 13, and Example 14, respectively.

In FIGS. 13 to 16, the wireless information recording medium 110 is transported in a leftward direction, and further transported in a re-writable recording apparatus.

The re-writable recording apparatus conducts image deletion and recording (image deleting and recording) processes to the wireless information recording medium 110.

In the above-described wireless information recording medium 110 according to Examples 1 to 10, each step face formed on the cushioning material layer 2, the support layer 3, and the protection layer 7 are vertical or substantially vertical with respect to the surface of the reversible thermal recording medium 1.

However, in the wireless information recording medium 110 according to Examples 11 to 14 in FIGS. 13 to 16, at least one step face formed on the cushioning material layer 2, the support layer 3, and the protection layer 7 has been sloped.

The sloped face has an uphill gradient from left to right in FIGS. 13 to 16 with respect to the medium transport direction. Accordingly, a deleting roller of the re-writable recording apparatus rollingly climbs the sloped face, for example.

Figure 13:
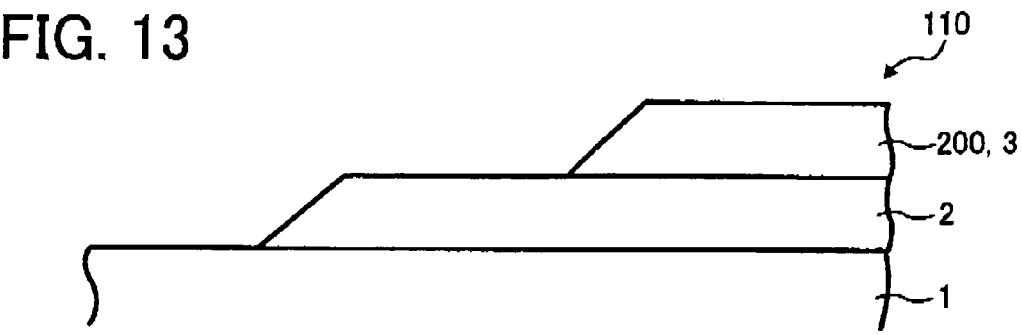
FIG. 13 is a sectional view of another example embodiment of a wireless information recording medium.
Figure 14:
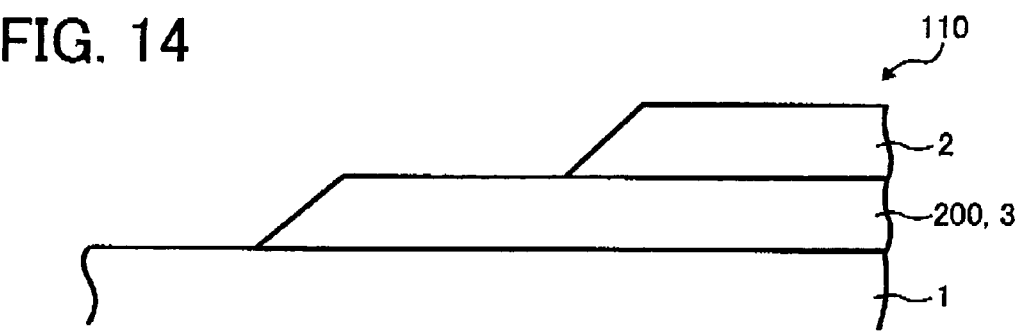
FIG. 14 is a sectional view of another example embodiment of a wireless information recording medium.
Figure 15:
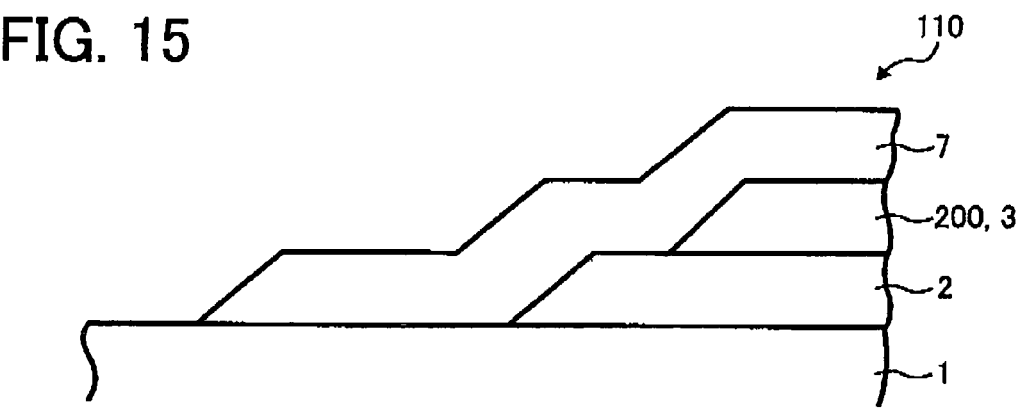
FIG. 15 is a sectional view of another example embodiment of a wireless information recording medium.
Figure 16:
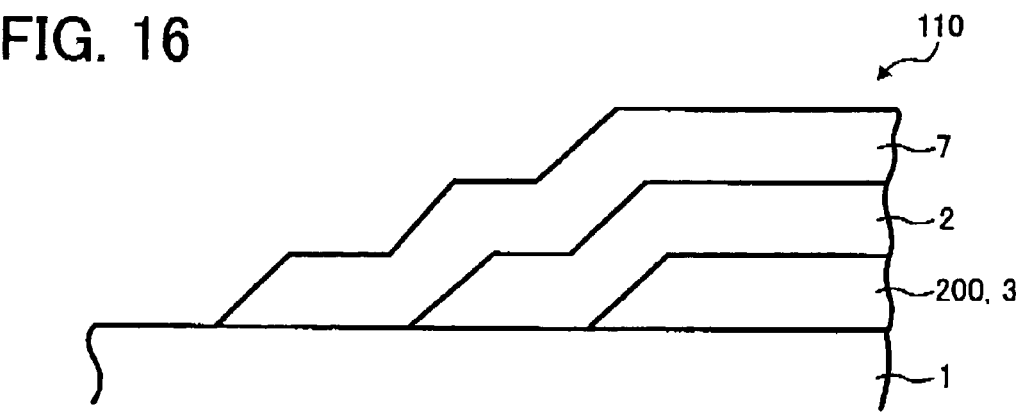
FIG. 16 is a sectional view of another example embodiment of a wireless information recording medium.

For example, in FIG. 13, the cushioning material layer 2 and the support layer 3 have sloped faces having an uphill gradient, and in FIG. 16, the cushioning material layer 2, the support layer 3, and the protection layer 7 have sloped faces having an uphill gradient.

Figure 19:
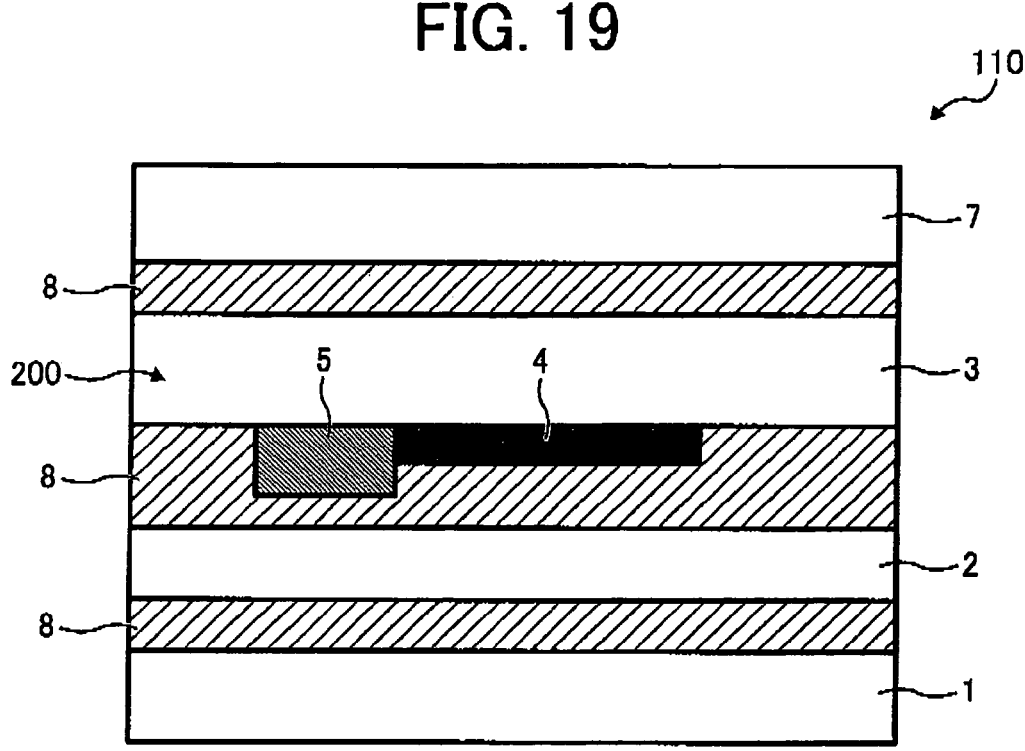
FIG. 19 is a schematic sectional view of another example embodiment of a wireless information recording medium.

FIG. 19 is another sectional view of the wireless information recording medium 110 of one example (Example 15).

In the wireless information recording medium 110 according to Example 15 in FIG. 19, the adhesive layer 8, the cushioning material layer 2, the adhesive layer 8, the information recording section 200, the adhesive layer 8, and the protection layer 7 are stacked on the reversible thermal recording medium 1 in such an order as shown in FIG. 19 from bottom to top.

Furthermore, in the wireless information recording medium 110 according to Example 15 in FIG. 19, the cushioning material layer 2, the support layer 3 having the information recording section 200, the adhesive layer 8, and the protection layer 7 are provided in a manner such that uphill steps are formed on each of the above-described four layers from a front to a rear direction of the medium transport direction.

In the wireless information recording medium 110 according to Examples, as shown in FIG. 5 or FIG. 7, the cushioning material layer 2, the support layer 3, and the protection layer 7 can form a downhill slope (or step) on the rear side of the each layer with respect to the medium transport direction.

By providing a downhill slope (or step), a pressing pressure applied to a rear portion of the wireless information recording medium 110 from a pressing member (such as heat roller) of the re-writable recording apparatus can be dispersed, which leads to favorable effect such as improvement of a life time of the wireless information recording medium 110.

Figure 20:
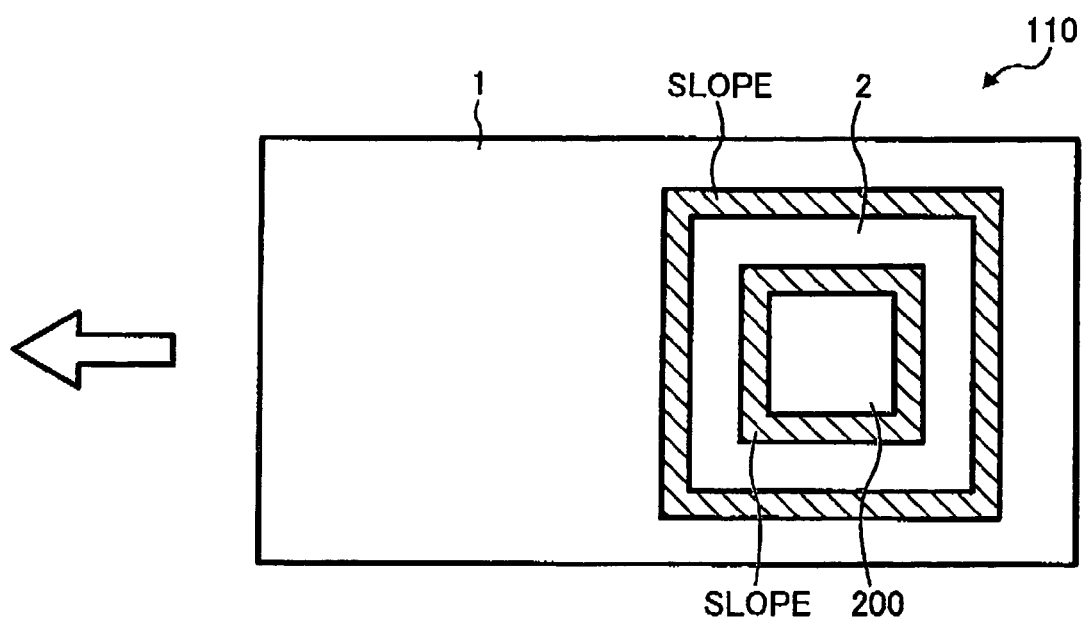
FIG. 20 is a schematic top view of another example embodiment of a wireless information recording medium.

In the wireless information recording medium 110 according to Example 16 shown in FIG. 20, the reversible thermal recording medium 1 is provided with materials such as cushioning material layer 2, and support layer 3 which form steps on the wireless information recording medium 110.

Specifically, layers such as cushioning material layer 2, and support layer 3 are provided on the reversible thermal recording medium 1 having a downhill slope (or step) in a manner that a center portion of each layer has a highest area and the outer periphery faces of each layer becomes lower and lower as outer periphery faces extend from the center portion. Forming such a step shape on the wireless information recording medium 110 is preferable.

FIG. 20 is a schematic top view of the wireless information recording medium 110 of one example (Example 16) having the above-described structures (i.e., steps) on the wireless information recording medium 110, in which a downhill slope (or step) is preferably formed from the center portion of each layer to the outer periphery faces of each layer.

Furthermore, as shown in FIGS. 4 and 5 with a dotted line, the reversible thermal recording medium 1 can be provided with a smooth slope having an uphill gradient instead of multi-step shape.

In such wireless information recording medium 110, the pressing member (such as deleting roller) of the re-writable recording apparatus rollingly climbs the smooth slope. Consequently, a pressing pressure can be uniformly applied to the information recording section 200.

Hereinafter, the above-described Examples are explained in more detail. For example, with regard to the wireless information recording medium 110 according to Example 1 in FIG. 3, a thickness of the information recording section (i.e., total thickness of the support layer 3 and the antenna circuit 4), and a thickness of the cushioning material layer 2 are set to a thickness of 5 to 450 μm, for example, and it is preferable to use such thickness as a height of the above-described step.

For example, with regard to the wireless information recording medium 110 according to Example 3 in FIG. 5, or Example 4 in FIG. 6, it is preferable that the protection layer 7 is set to a thickness of 5 to 450 μm to secure reliability of the information recording section 200 and set a height of each step of D1 to D8 to 5 to 450 μm.

Generally, the adhesive layer 8 has a thickness of 5 to 100 μm.

When using the cushioning material layer 2 having a thinner thickness without causing an effect due to such thinner thickness, a staple fiber or non-woven fabric having a thickness of 5 to 300 μm are used to obtain a sufficient flexibility and a predetermined cushionability, in which the staple fiber or non-woven fabric is used by a single layer or double layer. The staple fiber or non-woven fabric is provided with adhesives as shown in FIGS. 7 and 8.

Conditions of a platen of the re-writable recording apparatus affects a crack on the information recording element 5 or a deficiency to image deleting and recording.

Therefore, if the thickness of the cushioning material layer 2 is larger than 350 μm, such cushioning material layer 2 can be prepared as described below.

At first, a plurality of cushioning material sheets are prepared, in which each cushioning material sheet has a thickness of at least 5 μm and significantly smaller than 350 μm. Each cushioning material sheet has a different size so that when the cushioning material sheets are stacked, outer periphery faces of the stacked cushioning material sheets form a step-shape as a whole.

The outer periphery face of the cushioning material sheets are processed by a polishing apparatus so that faces of steps preferably have a sloped face having a mild gradient.

Furthermore, if each of the thickness of the information recording section 200 (total thickness of the support layer 3 and the antenna circuit 4), and the thickness of the cushioning material layer 2 is 5 to 1000 μm, it is preferable to conduct a polishing process to the outer periphery faces of the above-described layer in a similar manner to form a sloped face having a mild gradient.

Furthermore, if such step face or sloped face is formed on a front or rear side of the wireless information recording medium with respect to a medium transport direction, each component of the wireless information recording medium 110 can be attached on any area on the reversible thermal recording medium 1. Specifically, each component can be attached at a front, middle, or rear side of the wireless information recording medium 110, for example.

In addition to providing flexibility for the attachment position, the image deleting and recording preciseness to the reversible thermal recording medium 1 is improved and a life time of the wireless information recording medium 110 is increased.

When attaching the information recording section 200 to the reversible thermal recording medium 1, the IC tag label and the support layer 3 can be attached without any limitations. However, it is preferable to attach the IC tag label and the support layer 3 at a relatively rear side of the reversible thermal recording medium 1 with respect to the medium transport direction as shown in FIG. 3, for example, to easily form a multi-step shape on a relatively front side of the wireless information recording medium 110.

Figure 21:
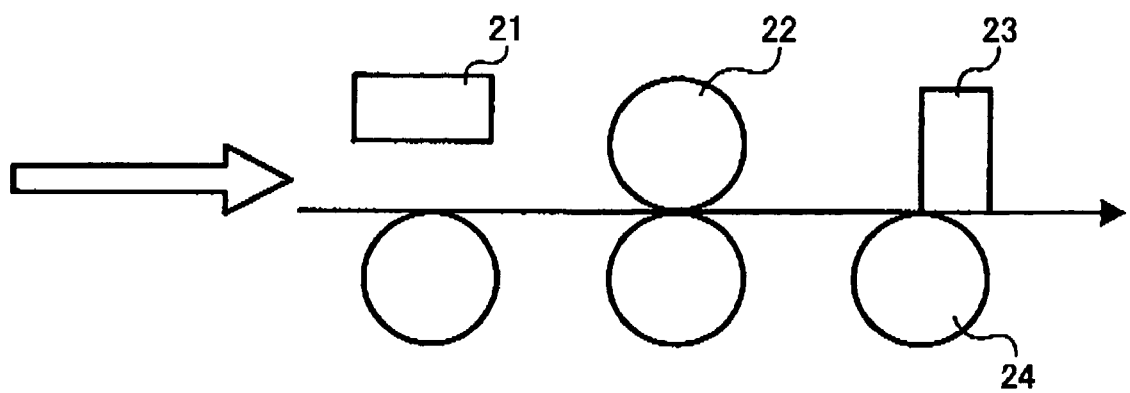
FIG. 21 is a schematic view of a re-writable recording apparatus, wherein the re-writable recording apparatus conducts image deleting and recording of images on a reversible thermal recording medium of a wireless information recording medium according to an example embodiment.
Figure 22:
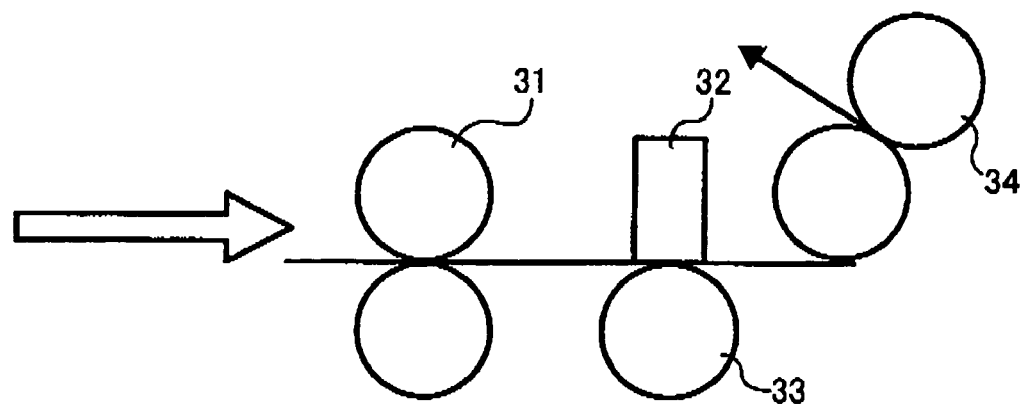
FIG. 22 is a schematic view of another re-writable recording apparatus according to an example embodiment.

FIGS. 21 and 22 show a schematic view illustrating a re-writable recording apparatus, which conducts image deleting and recording to the reversible thermal recording medium of the wireless information recording medium according to example embodiments.

As shown in FIG. 21, a wireless information recording medium (not shown) is transported in a direction shown by an arrow, let through a deleting bar 21, a transport roller 22, a thermal head 23, and a platen roller 24, and ejected to an outside of the re-writable recording apparatus.

When the wireless information recording medium 110 is transported in the re-writable recording apparatus, the deleting bar 21 deletes images on the reversible thermal recording medium 1, and the thermal head 23 and platen roller 24 conduct an image recording to the reversible thermal recording medium. Accordingly, the thermal head 23 and platen roller 24 are configured as an image printing section.

FIG. 22 shows another re-writable recording apparatus.

As shown in FIG. 22, a wireless information recording medium (not shown) is transported in a direction shown by an arrow, let through a heat roller 31, a thermal head 32, a platen roller 33, and a transport roller 34, and ejected to an outside of the re-writable recording apparatus.

When the wireless information recording medium 110 is transported in the re-writable recording apparatus, the heat roller 31 deletes images on the reversible thermal recording medium 1, and the thermal head 32 and platen roller 33 conduct an image recording to the reversible thermal recording medium 1. Accordingly, the thermal head 32 and platen roller 33 are configured as an image printing section.

The wireless information recording medium 110 can be transported in the re-writable recording apparatus at a transport speed of 10 to 100 mm/sec, for example.

The transport speed can be adjusted depending on a thickness of the reversible thermal recording medium 1.

Specifically, a transport speed of the wireless information recording medium 110 at a deletion section and an image printing section can be adjusted so that a correct image deleting and recording process using heating treatment can be conducted precisely and in an energy-saving manner.

Accordingly, the wireless information recording medium 110 and the re-writable recording apparatus are manufactured in view of such conditions.

When a re-writable recording apparatus has a relatively smaller size, image deleting and recording are conducted in a close area. Consequently, heating treatment is conducted by adjusting heat energy to conduct correct image deleting and recording processes.

If the step-to-step distance "d" (see FIG. 3) of the cushioning material layer 2 on the wireless information recording medium 110 is too small such as less than 2 mm, and the re-writable recording apparatus shown in FIG. 22 is used, a "curling" phenomena may happen to the information recording section because the re-writable recording apparatus shown in FIG. 22 applies a bending force to the wireless information recording medium at the transport roller 34.

Furthermore, if the step-to-step difference among each steps formed on the reversible thermal recording medium 1 of the wireless information recording medium 110 is too small such as less than 2 mm, an image printing deficiency such as pale image printing may occur with the re-writable recording apparatuses shown in FIGS. 21 and 22. Therefore, it is preferable to set such step-to-step difference among each steps to 2 mm or greater.

Hereinafter, printing experiments conducted with the following Example configurations and the results thereof are explained below.

EXAMPLE 1

The wireless information recording medium shown in FIG. 3 constitutes Example 1.

The 530BF (manufactured by Ricoh Company) having A4 size was used as the reversible thermal recording medium 1. The 530BF was used in all experiments (each Example) described below.

A urethane foam as a base material, and a double-stick tape "PTR-5060" (manufactured by Musashi chemical and synthetic industry corporation) having a total thickness of 400 μm coated with acrylic adhesive adhered to the urethane foam was used as the cushioning material layer 2.

An IC tag I code SLI (manufactured by Omron Corporation) having a film thickness of 30 μm was used as the information recording section 200. The support layer 3 which constituted the information recording section 200 had a film thickness of 30 μm.

As shown in FIG. 3, the cushioning material layer 2 was adhered on the reversible thermal recording medium 1, and the information recording section 200 was adhered on the cushioning material layer 2 to form the wireless information recording medium 110.

In Example 1, the support layer 3 was a top layer for the wireless information recording medium 110.

With the wireless information recording medium 110 of Example 1, image deleting and recording were conducted 50 times using three printers A, B, and C, wherein the image deleting and recording were conducted by printing three lines in a vertical direction on A4-sized sheet.

The result shows no "pale print," and good printing was conducted on an entire face of the wireless information recording medium 110.

In this experiment, "adhesion stain" and "peeling" of the information recording section 200 were observed, although the degree of such drawbacks was not significant. The "adhesion stain" was caused by overflow of adhesives or the like.

Printers A, B, C were used for the printing experiments. Printer A was a sheet printer "RSP1" manufactured by Panasonic Communications Co., Ltd. and had a configuration shown in FIG. 21. Printer B was a printer "RP 3100" manufactured by SANWA NEWTEC CO., LTD and had a configuration shown in FIG. 21. Printer C was a prototype printer manufactured by TOHOKU RICOH CO., LTD. and had a configuration shown in FIG. 22.

EXAMPLE 2

The wireless information recording medium shown in FIG. 4 constituted Example 2.

Example 2 used the reversible thermal recording medium 1, cushioning material layer 2, and information recording section 200 the same as Example 1.

In Example 2, the information recording section 200 was adhered on the reversible thermal recording medium 1. The support layer 3 was adhered on the reversible thermal recording medium 1 with the above-described double-stick tape.

The information recording section 200 was covered by the cushioning material layer 2, and the cushioning material layer 2 was adhered on the reversible thermal recording medium 1 with the above-described double-stick tape to form the wireless information recording medium 110.

A printing experiment was conducted with this wireless information recording medium 110 and the above-described Printers A, B, and C used under the same conditions as Example 1.

The result showed no "pale print," and good printing was conducted on an entire face of the wireless information recording medium 110.

In this experiment, "adhesion stain" and "peeling" of the information recording section 200 were observed, although the degree of such drawbacks was not significant.

EXAMPLE 3

The wireless information recording medium shown in FIG. 5 constituted Example 3.

In Example 3, the cushioning material layer 2 and the information recording section 200 used in Example 1 were covered by the protection layer 7, and the protection layer 7 was adhered to the cushioning material layer 2, the support layer 3 having the information recording section 200, and the reversible thermal recording medium 1 to form the wireless information recording medium 110.

A good quality tack paper of Super Stik 55PZ2 (manufactured by LINTEC Corporation) having a total thickness of 90 μm was used for the protection layer 7.

Such good quality tack paper can be adhered on other material by pressing the tack paper to the other material.

A printing experiment was conducted with this wireless information recording medium 110 and the above-described Printers A, B, and C under the same conditions of Example 1.

The result showed no "pale print," and good printing was conducted on an entire face of the wireless information recording medium 110.

In this experiment, "adhesion stain" and "peeling" of the information recording section 200 were observed, although the degree of such drawbacks was not significant.

EXAMPLE 4

The wireless information recording medium shown in FIG. 6 constituted Example 4.

Example 4 used the reversible thermal recording medium 1, cushioning material layer 2, and information recording section 200 same as Example 2.

These layers was covered by the protection layer 7 used in Example 3, and the protection layer 7 was adhered to the cushioning material layer 2 and the reversible thermal recording medium 1 to form the wireless information recording medium 110.

A printing experiment was conducted with this wireless information recording medium 110 and the above-described Printers A, B, and C under the same conditions of Example 1.

The result showed no "pale print," and good printing was conducted on an entire face of the wireless information recording medium 110.

In this experiment, "adhesion stain" and "peeling" of the information recording section 200 were observed, although the degree of such drawbacks was not significant.

EXAMPLE 5

The wireless information recording medium shown in FIG. 7 constituted Example 5.

Example 5 used the reversible thermal recording medium 1 and the information recording section 200 used in Example 1, and the protection layer 7 used in Example 3.

In Example 5, a double-stick tape of KIKU double tape No. 183 (manufactured by KIKUSUI TAPE Co.,) having a total thickness of 260 μm was used for the cushioning material layer 2. A staple fiber was coated with rubber-type adhesive.

In Example 5, the cushioning material layer 2 was adhered on the reversible thermal recording medium 1, and the information recording section 200 was adhered on the cushioning material layer 2.

Then, the cushioning material layer 2 and the information recording section 200 were covered by the protection layer 7, and the protection layer 7 was adhered to the cushioning material layer 2, the support layer 3, and the reversible thermal recording medium 1 to form the wireless information recording medium 110.

A printing experiment was conducted with this wireless information recording medium 110 and the above-described Printers A, B, and C under the same conditions of Example 1.

The result showed no "pale print," and good printing was conducted on an entire face of the wireless information recording medium 110.

In this experiment, "adhesion stain" and "peeling" of the information recording section 200 were observed, although the degree of such drawbacks was not significant.

EXAMPLE 6

The wireless information recording medium shown in FIG. 8 constituted Example 6.

Example 6 used the reversible thermal recording medium 1, the cushioning material layer 2 and the information recording section 200 used in Example 5, and the protection layer 7 used in Example 3.

The information recording section 200 was adhered on the reversible thermal recording medium 1 with the above-described double-stick tape of KIKU double tape No. 183.

In Example 6, the support layer 3 was adhered on the reversible thermal recording medium 1 by the double-stick tape.

As shown in FIG. 8, the cushioning material layer 2 was covered by the protection layer 7, and the protection layer 7 was adhered to the cushioning material layer 2 and the reversible thermal recording medium 1 to form the wireless information recording medium 110.

A printing experiment was conducted with this wireless information recording medium 110 and the above-described Printers A, B, and C under the same conditions of Example 1.

The result showed no "pale print," and good printing was conducted on an entire face of the wireless information recording medium 110.

In this experiment, "adhesion stain" and "peeling" of the information recording section 200 were observed, although the degree of such drawbacks was not significant.

EXAMPLE 7

The wireless information recording medium shown in FIG. 9 constituted Example 7.

In Example 7, as shown in FIG. 9, the wireless information recording medium 110 included the cushioning material layer 2 as a doubled-layer made of cushioning material.

Example 7 used the reversible thermal recording medium 1 and the information recording section 200 used in Example 1, and the protection layer 7 used in Example 3.

In Example 7, a double-stick tape of Double Face DF 1800 (manufactured by TOYO INK MFG. CO., LTD.) having a total thickness of 208 μm was used for the cushioning material layer 2. A non-woven fabric was coated with acrylic-type adhesive.

As shown in FIG. 9, the information recording section 200 was adhered on the reversible thermal recording medium 1, and the cushioning material layers 2A and 2B (i.e., a double layer) were adhered on the reversible thermal recording medium 1 and the information recording section 200. Then, the cushioning material layer 2B was covered by the protection layer 7, and the protection layer 7 was adhered to the cushioning material layer 2 and the reversible thermal recording medium 1 to form the wireless information recording medium 110.

A printing experiment was conducted with this wireless information recording medium 110 and the above-described Printers A, B, and C under the same conditions of Example 1.

The result showed no "pale print", and good printing was conducted on an entire face of the wireless information recording medium 110.

In this experiment, "adhesion stain" and "peeling" of the information recording section 200 were observed, although the degree of such drawbacks was not significant.

EXAMPLE 8

The wireless information recording medium shown in FIG. 10 constituted Example 8.

As shown in FIG. 10, the wireless information recording medium 110 of Example 8 included a layered structure of "protection layer 7/cushioning material layers 2A and 2B/information recording section 200/reversible thermal recording medium 1," and some outer periphery faces of each layer were formed in a sloped shape.

Example 8 used the reversible thermal recording medium 1 and the information recording section 200 used in Example 1, the protection layer 7 used in Example 3, and the cushioning material layer 2 used in Example 7.

In Example 8, the information recording section 200 was adhered on the reversible thermal recording medium 1, and outer periphery faces of the support layer 3 having the information recording section 200 were processed by a sand paper to process the step to slope. Then, the information recording section 200 was covered by the cushioning material layer 2, and outer periphery faces of the cushioning material layer 2 were processed by sand paper to process the step to slope. Then, the cushioning material layer 2 was covered by the protection layer 7, and the protection layer 7 was adhered to the cushioning material layer 2 and the reversible thermal recording medium 1. Outer periphery faces of the protection layer 7 were processed by sand paper to process the step to slope.

With such process, the wireless information recording medium 110 constituted Example 8.

A printing experiment was conducted with this wireless information recording medium 110 and the above-described Printers A, B, and C under the same conditions of Example 1.

The result showed no "pale print," and good printing was conducted on an entire face of the wireless information recording medium 110, and also showed no "peeling" of the information recording section 200.

In this experiment, "adhesion stain" was observed, although the degree of such drawbacks was not significant.

EXAMPLE 9

The wireless information recording medium shown in FIG. 11 constituted Example 9.

Example 9 used the reversible thermal recording medium 1 and the protection layer 7 used in Example 3.

An IC tag I code SLI (manufactured by DNP (DAI NIPPON PRINTING CO., LTD.)) having a thickness 100 μm was used for the information recording section 200. The support layer 3 had a thickness of 100 μm.

A double-stick tape of Double Face R202M (manufactured by TOYO INK MFG. CO., LTD.) having a total thickness of 72 μm was used for the cushioning material layer 2. A nonwoven fabric was coated with acrylic-type adhesive.

As shown in FIG. 11, the information recording section 200 was adhered on the reversible thermal recording medium 1, and the cushioning material layer 2 was adhered on the information recording section 200. Then, the cushioning material layer 2 was covered by the protection layer 7, and the protection layer 7 was adhered to the cushioning material layer 2 and the reversible thermal recording medium 1 to form the wireless information recording medium 110.

A printing experiment was conducted with this wireless information recording medium 110 and the above-described Printers A, B, and C under the same conditions of Example 1.

The result showed no "pale print," and good printing was conducted on an entire face of the wireless information recording medium 110.

The result also showed no "peeling" of the information recording section 200 and "adhesion stain."

In Example 9, the support layer 3 having the information recording section 200 had a thickness of 100 μm, which was relatively thick. Therefore, "image printing deficiency" was observed, but the degree of such drawbacks was not significant for practical use.

EXAMPLE 10

The wireless information recording medium shown in FIG. 12 constituted Example 10.

Instead of the IC tag I code SLI (manufactured by DNP (DAI NIPPON PRINTING CO., LTD.)) used as the information recording section 200 in Example 9, in Example 10, an IC tag I code SLI (manufactured by Omron Corporation) was used as the information recording section 200 and the support layer 3 had a thickness of 30 μm.

As for the cushioning material layer 2, instead of the above-described Double Face R202M used in Example 9, a double-stick tape of Y-9479 (manufactured by Sumitomo 3M Limited) having a total thickness of 85 μm was used, in which a polyester base material was coated with acrylic-type adhesive. Other conditions were the same as in Example 9.

A printing experiment was conducted with this wireless information recording medium 110 and the above-described Printers A, B, and C under the same conditions of Example 1.

The result showed no "pale print," and good printing was conducted on an entire face of the wireless information recording medium 110.

The result also showed no "peeling" of the information recording section 200 and "adhesion stain."

The above-described features of wireless information recording mediums according to Examples 1 to 10 are summarized as shown below in Table 1 and Table 2.

TABLE 1

| | Reversible thermal recording medium | Cushioning material | Information recording section | Protection layer | FIG. |
|---|---|---|---|---|---|
| Example 1 | Ricoh 530BF | Musashi chemical and synthetic industry corporation: PTR-5060 (double-stick tape) | Omron IC tag I code SLI | None | 3 |
| Example 2 | Ricoh 530BF | Musashi chemical and synthetic industry corporation: PTR-5060 (double-stick tape) | Omron IC tag I code SLI | None | 4 |
| Example 3 | Ricoh 530BF | Musashi chemical and synthetic industry corporation: PTR-5060 (double-stick tape) | Omron IC tag I code SLI | LINTEC Corporation: Super Stik 55PZ2 | 5 |
| Example 4 | Ricoh 530BF | Musashi chemical and synthetic industry corporation: PTR-5060 (double-stick tape) | Omron IC tag I code SLI | LINTEC Corporation: Super Stik 55PZ2 | 6 |
| Example 5 | Ricoh 530BF | KIKUSUI TAPE Co., KIKU double tape No. 183 (double-stick tape) | Omron IC tag I code SLI | LINTEC Corporation: Super Stik 55PZ2 | 7 |

TABLE 2

| | Reversible thermal recording medium | Cushioning material | Information recording section | Protection layer | FIG. |
|---|---|---|---|---|---|
| Example 6 | Ricoh 530BF | KIKUSUI TAPE Co., KIKU double tape No. 183 (double-stick tape) | Omron IC tag I code SLI | LINTEC Corporation: Super Stik 55PZ2 | 8 |
| Example 7 | Ricoh 530BF | TOYO INK MFG. CO., LTD. Double Face DF1800 (double-stick tape, two fold) | Omron IC tag I code SLI | LINTEC Corporation: Super Stik 55PZ2 | 9 |
| Example 8 | Ricoh 530BF | KIKUSUI TAPE Co., KIKU double tape No. 183 (double-stick tape) | Omron IC tag I code SLI | LINTEC Corporation: Super Stik 55PZ2 | 10 |
| Example 9 | Ricoh 530BF | TOYO INK MFG. CO., LTD. Double Face R202M (double-stick | DNP IC tag I code SLI | LINTEC Corporation: Super Stik 55PZ2 | 11 |

TABLE 2-continued

| Reversible thermal recording medium | Cushioning material | Information recording section | Protection layer | FIG. |
|---|---|---|---|---|
| Example 10 | Ricoh 530BF | Sumitomo 3M Limited Y-9479 (tape) | Omron IC tag I code SLI | LINTEC Corporation: Super Stik 55PZ2 | 12 |

COMPATATIVE EXAMPLE 1

The wireless information recording medium shown in FIG. 1 constituted Comparative Example 1.

Comparative Example 1 used the reversible thermal recording medium 1, the information recording section 200, and the protection layer 7 used in Example 3.

However, Comparative Example 1 did not have the cushioning material layer 2, and the outer periphery faces on the wireless information recording medium 100 were different from Example 3.

In Example 3, each of the cushioning material layer 2 and the support layer 3 had steps on outer periphery faces of each layer, and the protection layer 7 had corresponding steps as shown in FIG. 5.

Figure 1A:
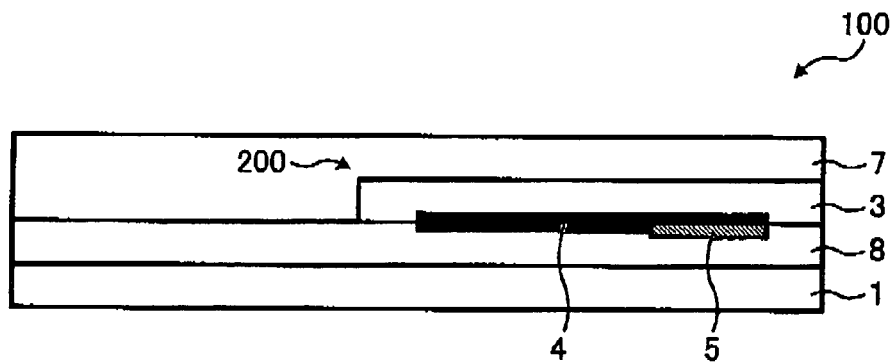
FIG. 1A is a sectional view at a line A-A in FIG. 1.

However, Comparative Example 1 had no step shape as shown in FIG. 1A.

Figure 1B:
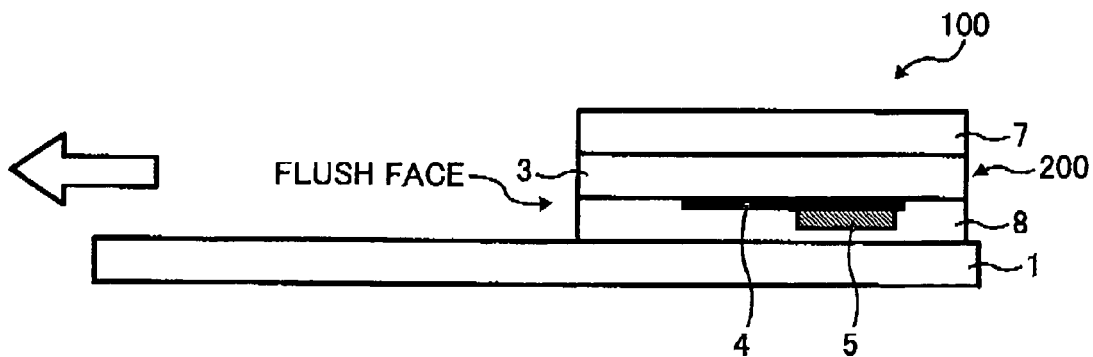
FIG. 1B is a sectional view at a line B-B in FIG. 1.

As shown in FIG. 1B, the support layer 3 and the protection layer 7 fomed a flush face on their outer periphery faces, and the flush face was vertical or substantially vertical to a surface of the reversible thermal recording medium 1.

A printing experiment was conducted with this wireless information recording medium 100 and the above-described Printers A, B, and C under the same conditions of Example 1.

The result showed "pale print" for the Printers A, B, and C for all experiments, and also showed "adhesion stain" after conducting image deleting and recording repeatedly on an entire face of the wireless information recording medium 110.

The result also showed "peeling" of the information recording section 200 at the above-described flush face when the Printer C was used.

COMPATATIVE EXAMPLE 2

The wireless information recording medium shown in FIG. 2 constituted Comparative Example 2.

Different from Comparative Example 1 shown in FIG. 1 in which the support layer 3 contacted the protection layer 7, in Comparative Example 2, the support layer 3 contacted the reversible thermal recording medium 1 via the adhesive layer 8.

Comparative Examples 1 and 2 have similar configurations for other portions.

A printing experiment was conducted with this wireless information recording medium 100 and the above-described Printers A, B, and C under the same conditions of Example 1.

The result showed "pale print" for the Printers A, B, and C for all experiments, and also showed "adhesion stain" after conducting image deleting and recording repeatedly on an entire face of the wireless information recording medium 110.

The result also showed "peeling" of the information recording section 200 at the above-described flush face when the Printer C was used.

The wireless information recording medium (reversible thermal recording medium having information recording section) according to example embodiments can be used in a variety of ways such as a ticket, a sticker for frozen food container, an industrial product, a medicine container, a document sheet (e.g., A4 sized sheet) for logistic management, for manufacturing process management, or for document management, for example.

Numerous additional modifications and variations are possible in light of the above teachings. It is therefore to be understood that within the scope of the appended claims, the disclosure of the present invention may be practiced otherwise than as specifically described herein.

What is claimed is:

1. A wireless information recording medium to be inserted into a re-writable recording apparatus to re-write information in the wireless information recording medium, the wireless information recording medium comprising:
   a reversible thermal recording medium;
   a cushioning material layer provided on the reversible thermal recording medium;
   an information recording section including an information recording element and an antenna circuit configured to receive and transmit information for the information recording element; and
   a support layer configured to support the information recording section, and provided on the cushioning material layer;
   wherein the support layer is stacked on the cushioning material layer and the cushioning material layer is stacked on the reversible thermal recording medium in a step-wise configuration.

2. The wireless information recording medium according to claim 1, wherein a first side of the wireless information recording medium faces the re-writable recording apparatus, and a second side of the wireless information recording medium is an opposite side of the first side of the wireless information recording medium, wherein the wireless information recording medium is inserted into the re-writable recording apparatus from the first side of the wireless information recording medium.

3. The wireless information recording medium according to claim 1, further comprising a protection layer configured to cover entirely the support layer and the cushioning material layer, the protection layer is stacked in proximity to and as an additional step on the step-wise configuration of the cushioning material layer and the support layer.

4. The wireless information recording medium according to claim 3, wherein the step-wise configuration of the cushioning material layer, the support layer, and the protection layer includes a slope face having an uphill gradient on a first side of the wireless information recording medium.

5. The wireless information recording medium according to claim 4, wherein the cushioning material layer, the support layer, and the protection layer form a step-wise configuration having a downhill gradient on a second side of the wireless information recording medium.

6. The wireless information recording medium according to claim 3, wherein, when viewing the wireless information recording medium from a top side perspective, a center portion of the wireless information recording medium forms a pinnacle and outer periphery faces of each of the cushioning material layer, the support layer, and the protection layer form a downhill gradient from the pinnacle as the outer periphery faces of each of the cushioning material layer, the support layer, and the protection layer are distanced from the center portion of the wireless information recording medium.

7. The wireless information recording medium according to claim 3, wherein the step-wise configuration formed by the cushioning material layer, the support layer, and the protection layer has a step-to-step distance of 2 mm or greater.

8. The wireless information recording medium according to claim 1, wherein the cushioning material layer includes any one of fabric or non-woven fabric coated with an adhesive layer on a top and bottom face of the cushioning material layer, in which the adhesive layer adheres the cushioning material layer to another layer.

9. The wireless information recording medium according to claim 1, wherein the cushioning material layer includes a doubled-layer made of cushioning material.

10. The wireless information recording medium according to claim 1, wherein the information recording section provided on the wireless information recording medium has a size which corresponds to dimensions of a recording section and deleting section of the re-writable recording apparatus.

11. A wireless information recording medium to be inserted into a re-writable recording apparatus to re-write information in the wireless information recording medium, the wireless information recording medium comprising:
  a reversible thermal recording medium;
  an information recording section including an information recording element and an antenna circuit configured to receive and transmit information for the information recording element;
  a support layer configured to support the information recording section, and provided on the reversible thermal recording medium; and
  a cushioning material layer configured to cover the support layer;
  wherein the support layer and the cushioning material layer are stacked on the reversible thermal recording medium in a step-wise configuration.

12. The wireless information recording medium according to claim 11, wherein a first side of the wireless information recording medium faces the re-writable recording apparatus, and a second side of the wireless information recording medium is an opposite side of the first side of the wireless information recording medium, wherein the wireless information recording medium is inserted into the re-writable recording apparatus from the first side of the wireless information recording medium.

13. The wireless information recording medium according to claim 11, further comprising a protection layer configured to cover entirely the cushioning material layer, the protection layer is stacked in proximity to and as an additional step on the step-wise configuration of the cushioning material layer.

14. The wireless information recording medium according to claim 13, wherein the step-wise configuration of the cushioning material layer, the support layer, and the protection layer includes a slope face having an uphill gradient on a first side of the wireless information recording medium.

15. The wireless information recording medium according to claim 14, wherein the cushioning material layer, and the protection layer form a step-wise configuration having a downhill gradient on a second side of the wireless information recording medium.

16. The wireless information recording medium according to claim 13, wherein, when viewing the wireless information recording medium from a top side perspective, a center portion of the wireless information recording medium forms a pinnacle and outer periphery faces of each of the cushioning material layer, and the protection layer forms a downhill gradient from the pinnacle as the outer periphery faces of each of the cushioning material layer, and the protection layer are distanced from the center portion of the wireless information recording medium.

17. The wireless information recording medium according to claim 13, wherein the step-wise configuration formed by the cushioning material layer, the support layer, and the protection layer has a step-to-step distance of 2 mm or greater.

18. The wireless information recording medium according to claim 11, wherein the cushioning material layer includes any one of fabric or non-woven fabric coated with an adhesive layer on a top and bottom face of the cushioning material layer, in which the adhesive layer adheres the cushioning material layer to another layer.

19. The wireless information recording medium according to claim 11, wherein the cushioning material layer includes a doubled-layer made of cushioning material.

20. The wireless information recording medium according to claim 11, wherein the information recording section provided on the wireless information recording medium has a size which corresponds to dimensions of a recording section and deleting section of the re-writable recording apparatus.

* * * * *